(12) United States Patent
Liao et al.

(10) Patent No.: US 8,411,234 B2
(45) Date of Patent: Apr. 2, 2013

(54) ACTIVE ARRAY SUBSTRATE, ELECTRODE SUBSTRATE, AND LIQUID CRYSTAL DISPLAY PANEL CAPABLE OF LOCATING IONS IN A NON-DISPLAY REGION

(75) Inventors: Chien-Huang Liao, Hsinchu (TW); Pin-Miao Liu, Hsinchu (TW); Yu-Chieh Chen, Hsinchu (TW); Tien-Lun Ting, Hsinchu (TW); Tung-Yu Chen, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 963 days.

(21) Appl. No.: 12/177,506

(22) Filed: Jul. 22, 2008

(65) Prior Publication Data

US 2009/0244416 A1  Oct. 1, 2009

(30) Foreign Application Priority Data

Mar. 31, 2008 (TW) ................... 97111774 A

(51) Int. Cl.
*G02F 1/1333* (2006.01)
(52) U.S. Cl. ...................... 349/111; 349/177
(58) Field of Classification Search .......... 349/111, 349/177
See application file for complete search history.

(56) References Cited

U.S. PATENT DOCUMENTS

| 5,767,926 | A | 6/1998 | Kim et al. | |
|---|---|---|---|---|
| 5,877,835 | A * | 3/1999 | Dunn et al. | 349/182 |
| 6,462,798 | B1 | 10/2002 | Kim et al. | |
| 6,476,416 | B1 | 11/2002 | Ikeda | |
| 6,803,976 | B1 | 10/2004 | Fujioka et al. | |
| 6,839,122 | B2 | 1/2005 | Chung et al. | |
| 2002/0008821 | A1 * | 1/2002 | Lee et al. | 349/139 |
| 2003/0103183 | A1 * | 6/2003 | Kim et al. | 349/146 |

(Continued)

FOREIGN PATENT DOCUMENTS

| CN | 101021657 | 8/2007 |
|---|---|---|
| CN | 101144952 | 3/2008 |
| JP | 2000-29071 A1 | 1/2000 |
| TW | I464836 | 11/2001 |
| TW | 587191 | 5/2004 |

OTHER PUBLICATIONS

K. Neyts, S. Vermael, C. Desimpel, G. Stojmenovik, A. R. M. Verschueren, D. K. G. de Boer, R. Snijkers, P. Machiels, and A. van Brandenburg, "Lateral ion transport in nematic liquid-crystal devices," Journal of Applied Physics, vol. 94, No. 6, Sep. 15, 2003.

(Continued)

*Primary Examiner* — Michael Caley
(74) *Attorney, Agent, or Firm* — McClure, Qualey & Rodack, LLP

(57) ABSTRACT

An active array substrate, an electrode substrate, and a liquid crystal display panel (LCD) are provided. The LCD includes an active array substrate, an electrode substrate, and a liquid crystal layer. The active array substrate includes a base, a plurality of scan lines and data lines disposed on the base, a plurality of pixel electrodes, and a plurality of active devices. Each of the active devices is electrically connected to the corresponding scan line, date line, and pixel electrode to define a pixel region and a non-display region. The electrode substrate includes a base and a common electrode disposed on the base of the electrode substrate. The liquid crystal layer is formed between the active array substrate and the electrode substrate and includes liquid molecules with a threshold voltage, a saturation voltage and ions located in the non-display region.

25 Claims, 28 Drawing Sheets

U.S. PATENT DOCUMENTS

| | | | |
|---|---|---|---|
| 2006/0061722 | A1 | 3/2006 | Jun |
| 2006/0091389 | A1 | 5/2006 | Jun |
| 2006/0256245 | A1 | 11/2006 | Verschueren et al. |
| 2007/0134883 | A1* | 6/2007 | Lee et al. .................... 438/398 |
| 2007/0146599 | A1* | 6/2007 | Uchida et al. ............... 349/129 |
| 2007/0195213 | A1 | 8/2007 | Oh |
| 2008/0266480 | A1 | 10/2008 | Lee |

OTHER PUBLICATIONS

G. Stojmenovik, S. Vermael, K. Neyts, R. van Asselt, and A. R. M. Verschueren, "Dependence of the lateral ion transport on the driving frequency in nematic liquid crystal displays," Journal of Applied Physics, vol. 96, No. 7, Oct. 1, 2004.

English language translation of abstract of JP2000-29071 A1.
Taiwan office action dated Nov. 25, 2011.
English language translation of Chinese language office action dated Mar. 25, 2010.
Chinese language office action dated Mar. 25, 2010.
English language translation of abstract of CN 101021657 (published Aug. 22, 2007).
English language translation of abstract of TW 587191.
China office action dated Apr. 6, 2012.
Taiwan Notice of Allowance and search report dated Mar. 27, 2012.
China Office Action with Search Report mailed Sep. 13, 2012.

* cited by examiner

ACTIVE ARRAY SUBSTRATE, ELECTRODE SUBSTRATE, AND LIQUID CRYSTAL DISPLAY PANEL CAPABLE OF LOCATING IONS IN A NON-DISPLAY REGION

This application claims the benefit of priority based on Taiwan Patent Application No. 097111774, filed on Mar. 31, 2008, the contents of which are incorporated herein by reference in their entirety.

CROSS-REFERENCES TO RELATED APPLICATIONS

Not applicable.

BACKGROUND OF THE INVENTION

1. Field of the Invention

The present invention generally relates to an active array substrate, an electrode substrate, and a liquid crystal display panel. More specifically, the present invention relates to an active array substrate, an electrode substrate, and a liquid crystal display panel wherein the residues and ions in the liquid crystal layer are confined in a specific region.

2. Descriptions of the Related Art

Liquid crystal displays have been widely used due to its thinness, light weight and low radiation. However, when manufacturing the liquid crystal display panel, before, within or after injecting or dropping the liquid crystal, some undesired residues, ions or pollutions may appear in the liquid crystal layer. After the liquid crystal display panel has been used and driven for a long time, distributions of those residues or ions would be changed by the movement, rotation or tilt of the liquid crystal. Those residues or ions will impact on the electrical field applied to the liquid crystal in the liquid crystal layer, so the brightness, contrast or quality of images will decay as the liquid crystal display panel is displaying images.

U.S. patent publication number 20060256245A1 dated in Nov. 16, 2006 discloses a lateral ion pumping disposed in the liquid crystal displays. The lateral ion pumping is configured to bump the ions outside of an addressable area. From the test results, the ion density of the pixels in the addressable area will decrease by the lateral ion pumping. Unfortunately, there may be some ions still left in the pixel regions, so the image quality will not sufficiently increase. As a result, the operation time of the lateral ion pumping must be increased, which is one of its main disadvantages.

As described above, it is important to control the residues or ions inside the liquid crystal layer properly without influencing the image quality and the working sufficiency of the liquid crystal display panel.

SUMMARY OF THE INVENTION

A primary objective of the present invention is to provide an active array substrate to solve the problem of bad uniformity of images of the liquid crystal display panel.

In accordance with the above objective, the active array substrate comprises a base, a plurality of scan lines, a plurality of data lines, a plurality of pixel electrodes, a plurality of active devices, and at least one auxiliary electrode. The scan lines are disposed on the base. The data lines are perpendicular to the scan lines. Each active device is electrically connected to the corresponding scan line, data line, and pixel electrode to define a pixel region and a non-display region. The at least one auxiliary electrode is disposed on the base and located in the non-display region, wherein the at least one auxiliary electrode is configured to receive an auxiliary voltage ranging from −30 volt to 30 volt.

In accordance with the above objective, the active array substrate further comprises a capacitor electrode disposed on the base. The capacitor electrode is electrically connected with the at least one auxiliary electrode.

In accordance with the above objective the active array substrate further comprises a capacitor electrode disposed on the base. The capacitor electrode and the auxiliary electrode are mutually isolated and located in the same layer. The at least one auxiliary electrode of the active array substrate is electrically connected to one of the scan lines.

In accordance with the above objective, the present invention provides an electrode substrate. The electrode substrate comprises a base, a common electrode and at least one shielding structure. The common electrode is disposed on the base. The shielding structure is disposed on the base to divide the common electrode into a plurality of blocks, wherein the shielding structure is configured to receive a voltage ranging from −30 volt to 30 volt.

In accordance with the above objective, the present invention provides an electrode substrate. The electrode substrate comprises a base and a common electrode. The base has a plurality of pixel regions. Each pixel region has a pixel width. The common electrode is disposed on the base. The common electrode has a plurality of slits. Each slit has a width being $1/20$ times to $1/5$ times of the pixel width.

In accordance with the above objective, the present invention provides a liquid crystal display panel comprising the above active array substrate and/or above electrode substrate.

The liquid crystal display panel of the present invention can limit the movement of the particles of the liquid crystal layer to avoid bad uniformity or particles appear in the pixel regions. The particles may include residues, ions or charged ions groups. Furthermore, the liquid crystal display panel of the present invention can confine the particles of the liquid crystal layer in specific regions such as a non-display region, to prevent too many particles from existing in the pixel regions and influencing the optical property of the liquid crystal molecules in the liquid crystal layer. Therefore, mura or image sticking can be prevented.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENT

Figure 1:
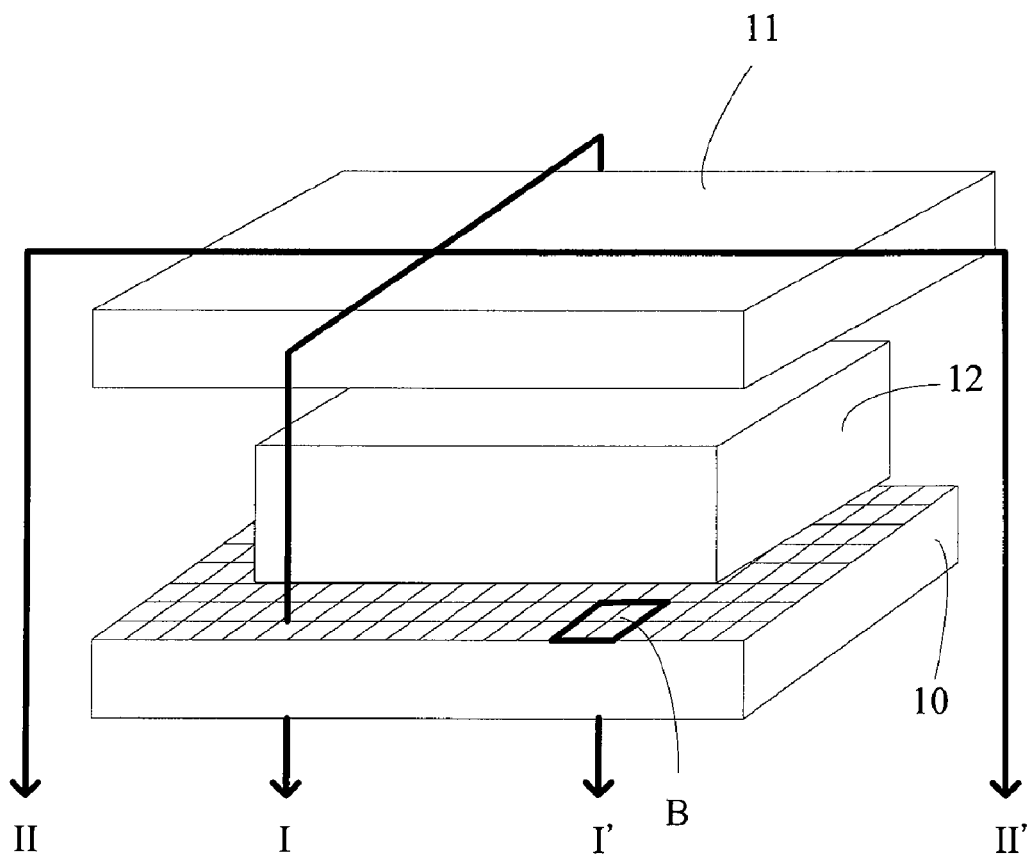
FIG. 1 is an exploded view illustrating a liquid crystal display panel of the present invention.

Reference will now be given in detail to the present preferred embodiments of the invention, examples of which are illustrated in the accompanying drawings. Wherever possible, the same reference numbers are used in the drawings and the description to refer to the same or like parts.

Before explaining the embodiments of the present invention, please refer to FIGS. 1 to 4. FIG. 1 is an exploded view illustrating the liquid crystal display panel for schematically showing the structure of the liquid crystal display panel of the present invention. The liquid crystal display panel 1 comprises an active array substrate 10, an electrode substrate 11 and a liquid crystal layer 12 disposed between the active array substrate 10 and the electrode substrate 11. The liquid crystal layer 12 comprises a plurality of liquid crystal molecules and/or a plurality of particles which might be ions, organic materials, inorganic material, residues, or the combination thereof, or other pollutions.

The active array substrate 10 and the electrode substrate 11 might be a thin film transistor substrate and a color filter substrate, respectively. For example, the active array substrate 10 could be a color filter on array (COA) substrate. The electrode substrate 11 could be formed by a common electrode incorporated with a base.

According to the liquid crystal display panel 1 of the present invention, the liquid crystal layer 12 operates in two different modes. Please refer to FIGS. 2a and 2b, which are cross sectional views along lines I-I' and II-II' in FIG. 1, respectively. The liquid crystal layer 12 operating in the first mode is divided into pixel region A and non-display region NA. By controlling the electric fields of the pixel region A and non-display region NA of the liquid crystal layer 12, e.g. pixel region A and non-display region NA are given different voltages (or electric field), liquid crystal molecules 121a located in the pixel region A and liquid crystal molecules 121b located in the non-display region NA will have different tilt directions. More specifically, the liquid crystal molecules 121b in the non-display region NA are arranged horizontally. Therefore, the ions 120 are confined in the non-display region NA, and each of the ions 120 comprises cation ions, anion ions, or charged ions group. In other words, the density of ions 120 in the non-display region NA is greater than that in the pixel region A. For example, the density of ions 120 in the non-display region NA is several times to hundred times of that in the pixel regions A, preferably, 2 times to 900 times. As a result, mural or image sticking can be improved.

Figure 3A:
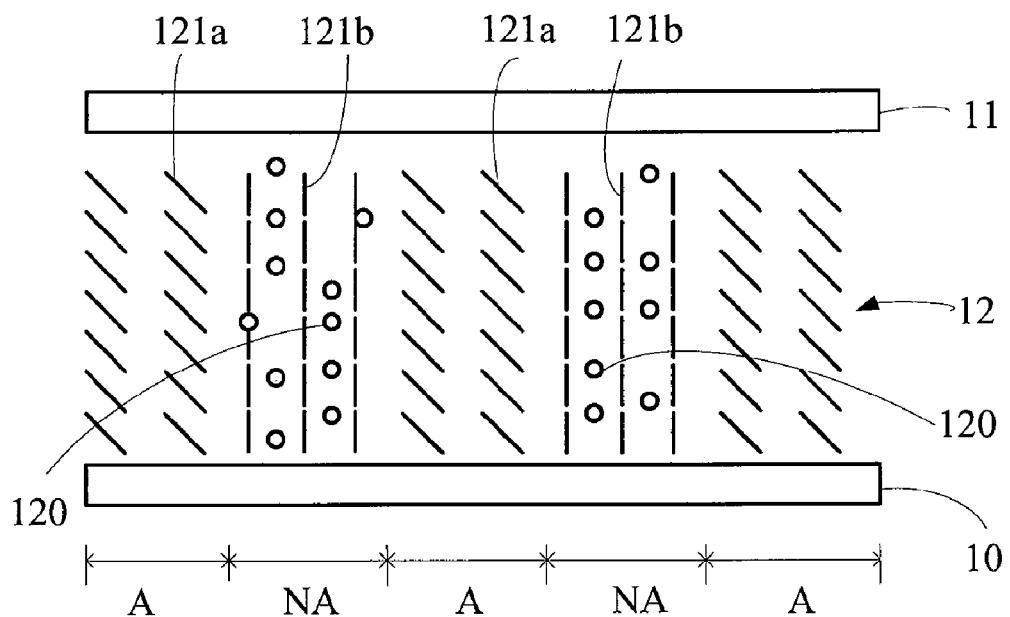
FIG. 3a is another cross-sectional view along hatching I-I' of the liquid crystal display panel in FIG. 1.
Figure 3B:
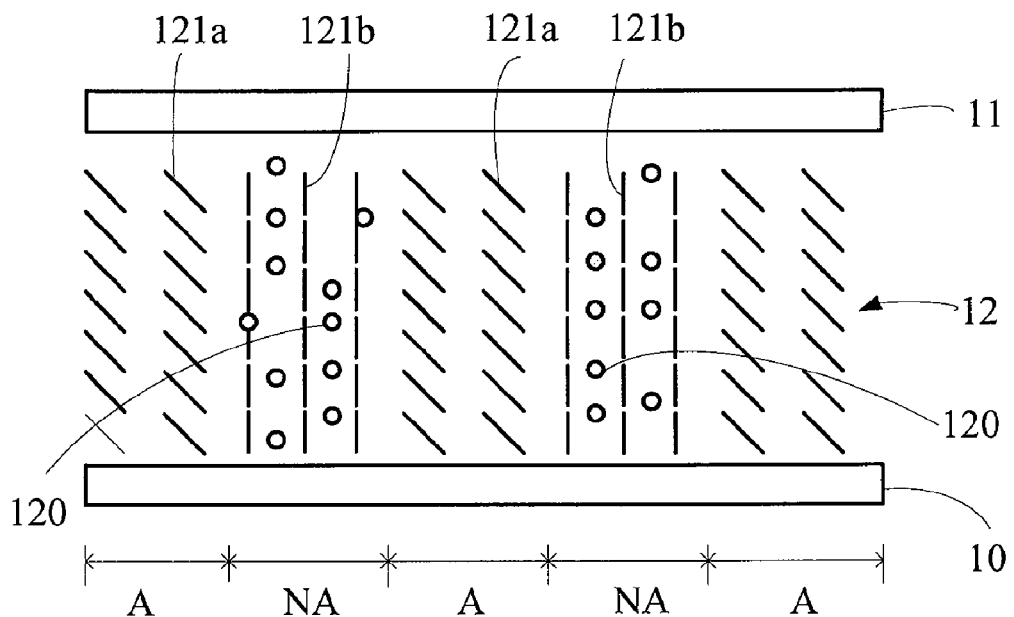
FIG. 3b is another cross-sectional view along hatching II-II' of the liquid crystal display panel in FIG. 1.

FIGS. 3a and 3b are another cross sectional views along lines I-I' and II-II' in FIG. 1, respectively. The liquid crystal layer 12 operating in the second mode is divided into pixel region A and non-display region NA. By controlling the electric fields of the pixel region A and non-display region NA of the liquid crystal layer 12, e.g. pixel region A and non-display region NA are given different voltages, the liquid crystal molecules 121a located in the pixel region A and liquid crystal molecules 121b located in the non-display region NA have different tilt directions. More specifically, the liquid crystal molecules 121b in the non-display region NA are arranged vertically. Therefore, ions 120 are confined in the non-display region NA. In other words, the density of ions 120 in the non-display region NA is greater than that in the pixel region A. For example, the density of the ions 120 in the non-display region NA is several times to hundred times of that in the pixel regions A, preferably, 2 times to 900 times. As a result, mura or image sticking is improved.

Figure 2A:
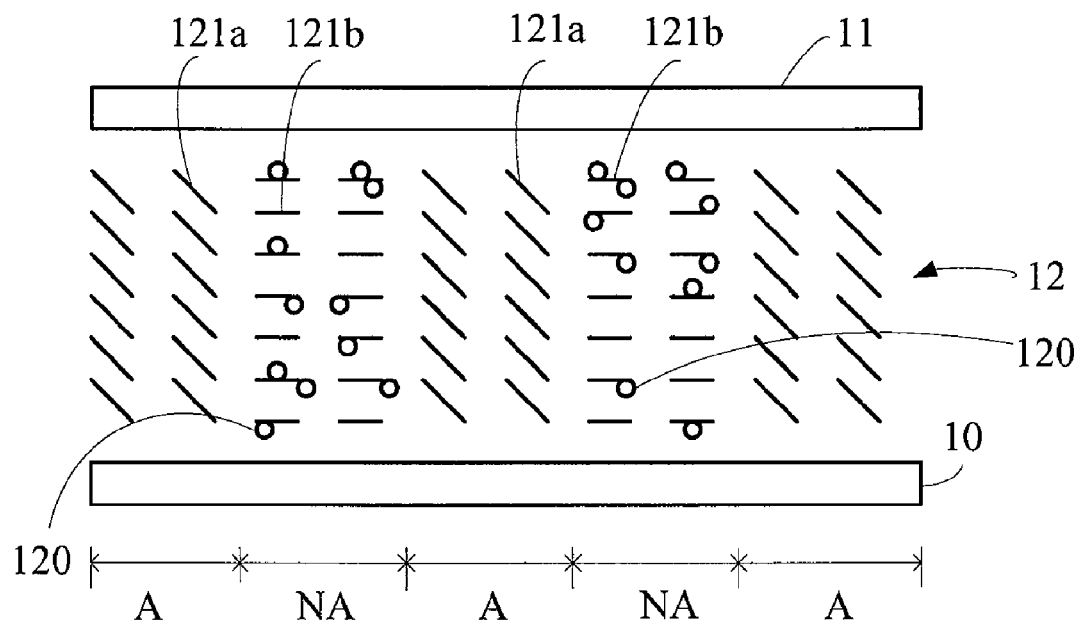
FIG. 2a is a cross-sectional view along hatching I-I' of the liquid crystal display panel in FIG. 1.
Figure 2B:
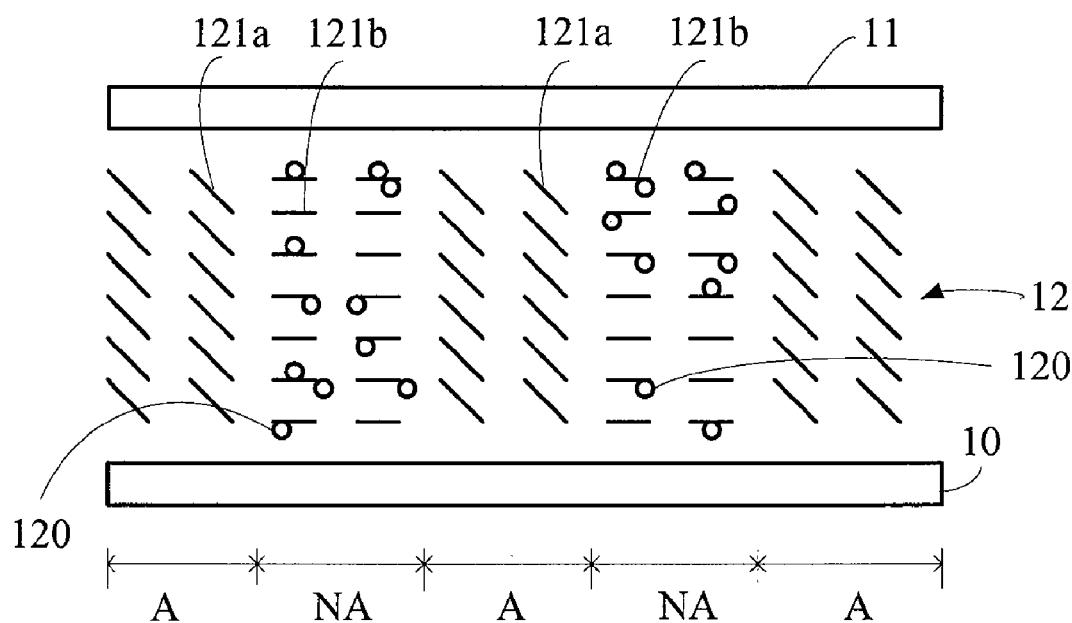
FIG. 2b is a cross-sectional view along hatching II-II' of the liquid crystal display panel in FIG. 1.

Therefore, to reach the results as shown in FIGS. 2a, 2b and/or 3a, 3b, the liquid crystal display panel 1 of the present invention comprises an active array substrate 10, electrode substrate 11, and liquid crystal layer 12. Furthermore, the active array substrate 10 comprises a base, a plurality of scan lines, a plurality of data lines, a plurality of pixel electrodes, and a plurality of active devices. The scan lines and data lines are disposed on the base. The data lines are perpendicular to the scan lines. Each active device is corresponding to one of the scan lines, one of the data lines and one of the pixel electrodes. Each active device is electrically connected to the corresponding scan line, data line and pixel electrode to define the pixel region A and the non-display region NA. The electrode substrate 11 comprises a base and a common electrode. The common electrode is disposed on the base. The liquid crystal layer 12 is disposed between the active array substrate 10 and the electrode substrate 11. The liquid crystal layer 12 comprises liquid crystal molecules 121a, 121b and ions 120. The liquid crystal molecules 121a and 121b have a threshold voltage and a saturation voltage. A specific percentage of the ions 120 are located in the non-display region NA.

The liquid crystal display panel 1 further comprises at least one auxiliary electrode disposed on the base of the active array substrate 10 and located in the non-display region NA. The auxiliary electrode is configured to receive an auxiliary voltage. The common electrode is configured to receive a common voltage. The absolute value of the difference between the auxiliary voltage and the common voltage is less than the threshold voltage of the liquid crystal molecules 121a and 121b. If the liquid crystal molecules 121a, 121b were vertical alignment (VA) liquid crystals, twisted nematic (TN) liquid crystals or/and electrical control birefringence (ECB) liquid crystals, the absolute value of the difference between the auxiliary voltage and the common voltage is greater than the saturation voltage of the liquid crystal molecules 121a, 121b.

Figure 4:
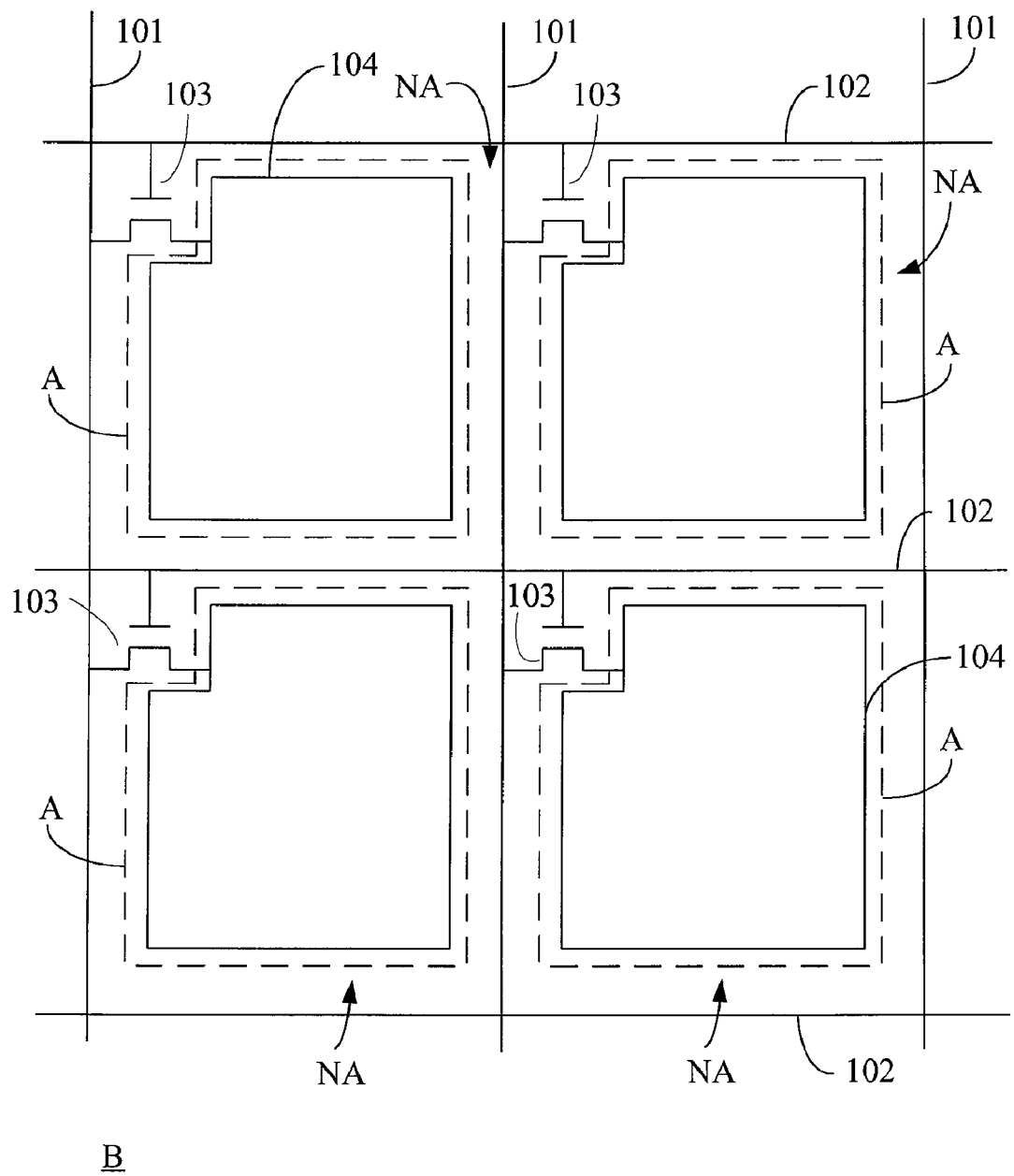
FIG. 4 is an enlarged diagram illustrating the region B of the liquid crystal display panel in FIG. 1.

FIG. 4 depicts an enlarged view illustrating the region B of the active array substrate 10 of the liquid crystal display panel 1 of the present invention in FIG. 1. For convenience, only four complete pixels are shown in FIG. 4, people skilled in the art can appreciate the pixels arrangement of the active array substrate 10. The active array substrate 10 comprises a base (not marked), scan lines 102, data lines 101 perpendicular to the scan lines 102, pixel electrodes 104 and thin film transistors 103. Each thin film transistor 103 is connected to corresponding scan line 102, data line 101 and pixel electrode 104. The active array substrate 10 further comprises at least one auxiliary electrode (not shown) and/or capacitor electrode (not shown). The data lines 101, scan lines 102 and pixel electrode 104 define pixel region A and non-display region NA. FIG. 4 shows four pixel regions A clearly. The pixel regions A are used for displaying images. The area outside the pixel regions A is the non-display region NA, where the data lines 101, scan lines 102, thin film transistors 103, auxiliary electrode and capacitor electrode are located. The non-display region NA is not for displaying images.

In reference to FIGS. 2a to 3b and FIG. 4, when ions 120 are confined in the non-display region NA, that is to say, a specific percentage of the ions 120 are located in the non-display region NA or so-called circuit region (i.e., most of the ions 120 are in the non-display region NA), the liquid crystal molecules 121a in the pixel region A are not easily influenced by the ions 120. Hence, incorrect rotation or tile of the liquid crystal molecules, mural, poor brightness, wrong contract or image duration may be minimized.

The embodiments of the liquid crystal display panel 1, active array substrate 10 and electrode substrate 11 are explained below.

First Embodiment

Figure 5A:
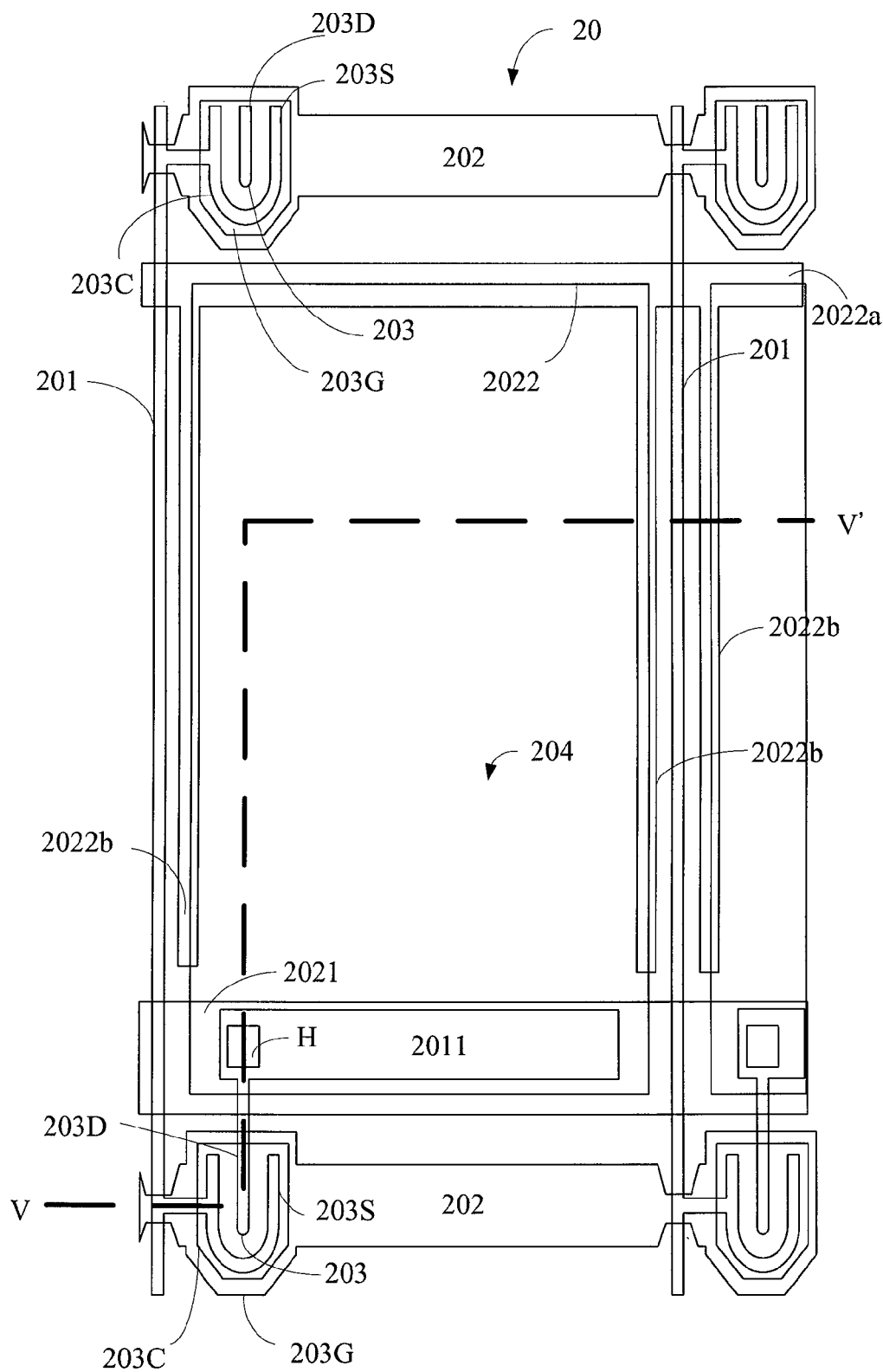
FIG. 5a is a top view illustrating the active array substrate of the first embodiment of the present invention.
Figure 5B:
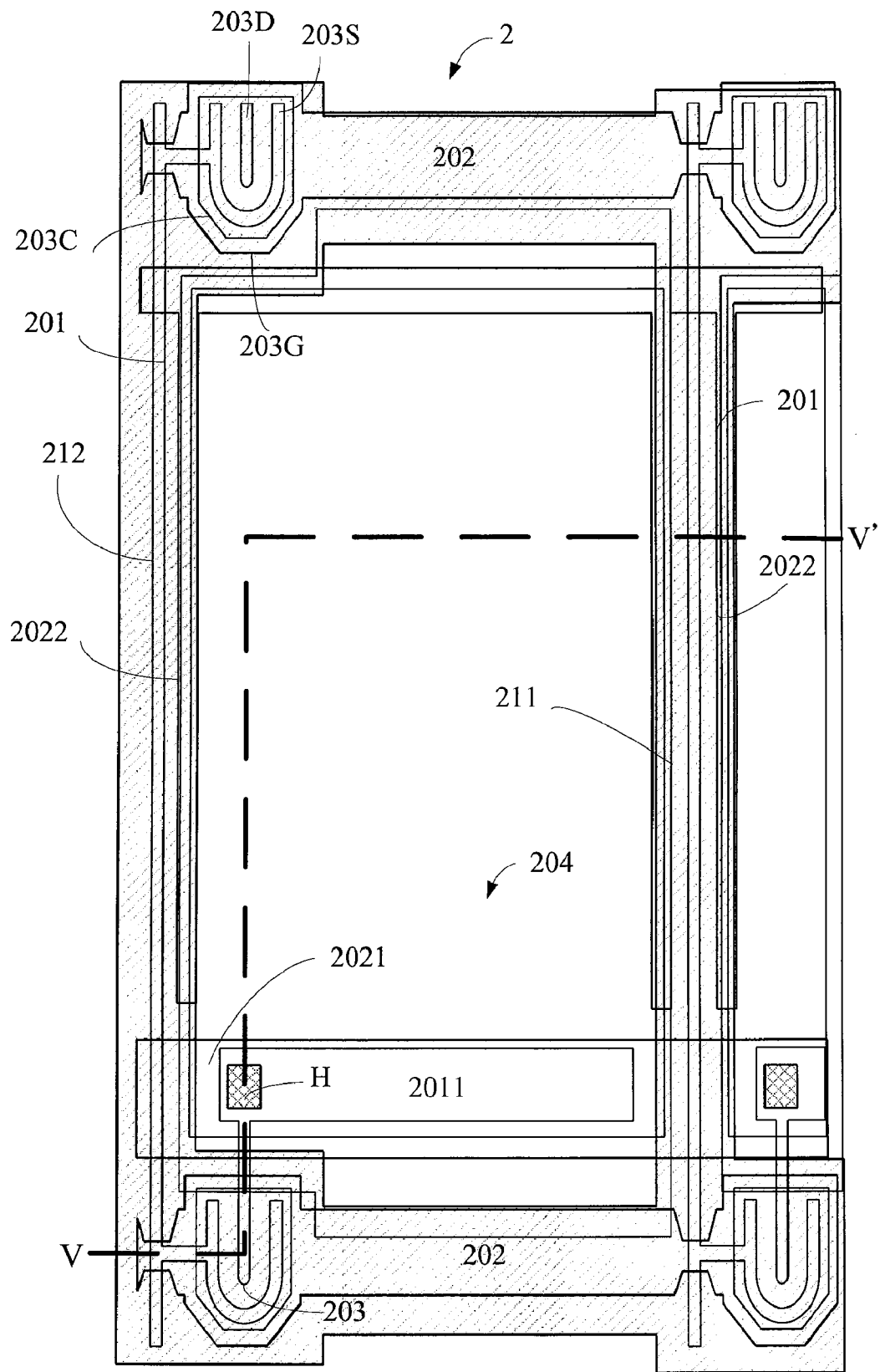
FIG. 5b is a top view illustrating the liquid crystal display panel of the first embodiment of the present invention.
Figure 5C:
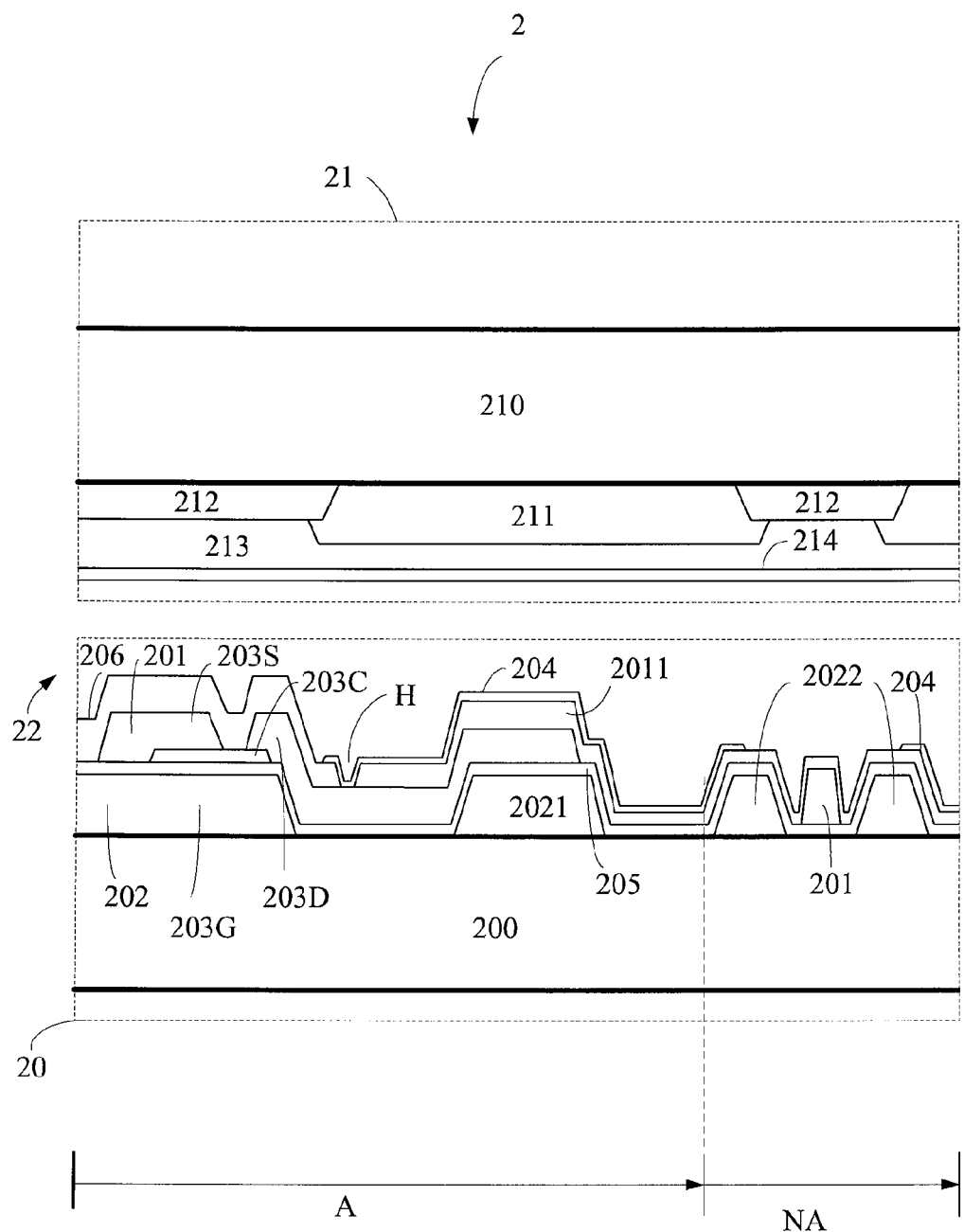
FIG. 5c is a cross-sectional view illustrating the liquid crystal display panel of the first embodiment of the present invention.

FIGS. 5a, 5b, and 5c respectively illustrate a top view of the active array substrate, a top view of the liquid crystal display panel, and a cross-sectional view of the liquid crystal display panel of the first embodiment of the present invention. More specifically, FIG. 5c depicts a cross-sectional view along line V-V' in FIG. 5b. For convenience, FIGS. 5a and 5b only show one pixel structure.

The active array substrate 20 comprises a base 200, scan lines 202, auxiliary electrode 2022, lower capacitor electrode 2021, insulator 205, data lines 201, active device 203, upper capacitor electrode 2011, dielectric layer 206 and pixel electrodes 204. The scan lines 202, auxiliary electrodes 2022 and lower capacitor electrodes 2021 are formed on the base 200. The insulator 205 completely covers the base 200, scan lines 202, auxiliary electrodes 2022 and lower capacitor electrodes 2021. The data lines 201 are formed on the insulator 205.

The active device 203 is formed on the base 200. Each active device 203 is electrically connected to one of the scan lines 202 and one of the data lines 201. More specifically, the active device 203 comprises gate 203G connected to scan line 202, source 203S connected to data line 201, drain 203D, and channel layer 203C located between the gate 203G and the source 203S/drain 203D. In the present embodiment, the active device 203 may be a bottom gate amorphous thin film transistor, for example, but is not limited thereto.

The upper capacitor electrode 2011 is connected to drain 203D and incorporated with the lower capacitor electrode 2021 to form a capacitor. The dielectric layer 206 substantially covers the above elements and has a contact hole H to expose drain 203D. The pixel electrode 204 is disposed on the dielectric layer 206 and electrically connected to drain 203D via the contact hole H.

The auxiliary electrode 2022, scan lines 202 and lower capacitor electrode 2021 are simultaneously formed by pre-forming a conductive layer and patterning. The auxiliary electrode 2022, scan lines 202 and lower capacitor electrode 2021 are mutually isolated and formed in the same layer. The auxiliary electrode 2022 is located in the non-display region NA. In FIG. 5a, the auxiliary electrode 2022 has main portion 2022a and branches 2022b. In the present embodiment, there are two branches 2022b between the two adjacent pixels. However, the number of branches 2022b can be changed to one or more than two depending on the design and demands. The auxiliary electrode 2022 may be designed selectively to have only a main portion 2022a or branches 2022b to form a shape in the form of a stripe or circle. That is to say, suitable shapes can be used for the auxiliary electrode 2022, such as a circle, stripe, U-shaped form, or ∩-shaped form. The auxiliary electrode 2022 is configured to receive an auxiliary voltage. The auxiliary voltage ranges from −30 volt to 30 volt, preferably from −10 volt to 25 volt.

In FIG. 5c, the liquid crystal display panel 2 comprises an active array substrate 20, an electrode substrate 21 and a liquid crystal layer 22 disposed therebetween as shown in FIG. 5a.

The liquid crystal layer 22 comprises liquid crystal molecules and ions. The liquid crystal molecules have a threshold voltage and a saturation voltage. A specific percentage of ions are located in the non-display region NA.

The electrode substrate 21 comprises a base 210, shielding structure 212, color filter layer 211, passivation 213 and common electrode 214. Both the shielding structure 212 and color filter layer 211 are disposed on the base 210. The color filter layer 211 is disposed between the base 210 and the common electrode 214. The color filter layer 211 is divided by the shielding structure 212. The shielding structure 212 can shield light at a boundary of the color filter layer 211 to prevent light leakage while the liquid crystal display panel 2 is displaying images. The common electrode 214 is configured to receive a common voltage. The absolute value of the difference between the auxiliary voltage and the common voltage is (1) less than or equal to 1 volt, or (2) from 3 volt to 20 volt.

Because of the arrangements of the auxiliary electrode 2022 of the active array substrate 20, the liquid crystal molecules of the liquid crystal layer 22 in the pixel region A and non-display region NA have different tilt directions. Therefore, the ions 120 would be confined in the non-display region NA. The problems of bad uniformity and image remain would then be minimized.

Second Embodiment

Figure 6A:
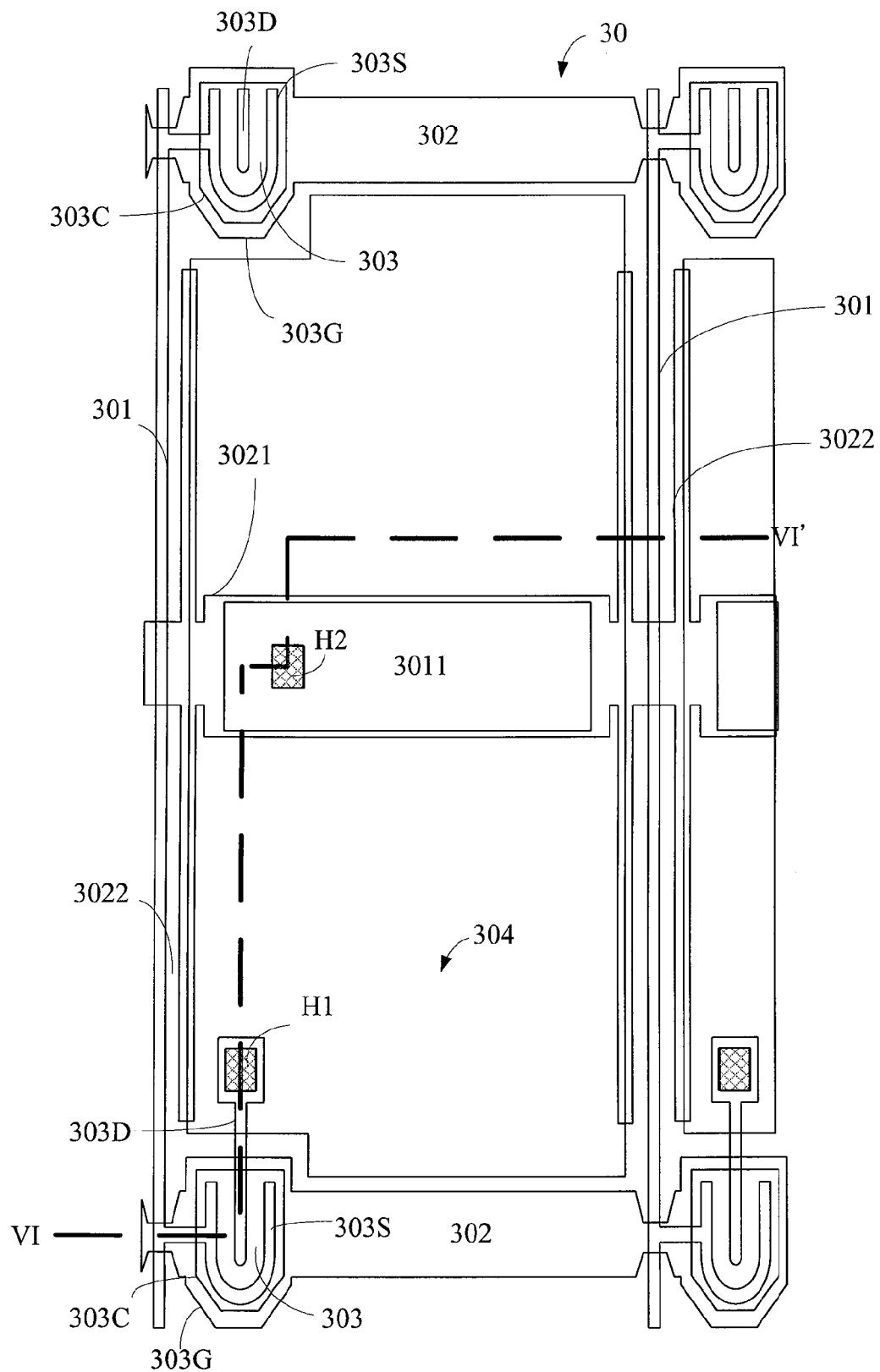
FIG. 6a is a top view illustrating the active array substrate of the second embodiment of the present invention.
Figure 6B:
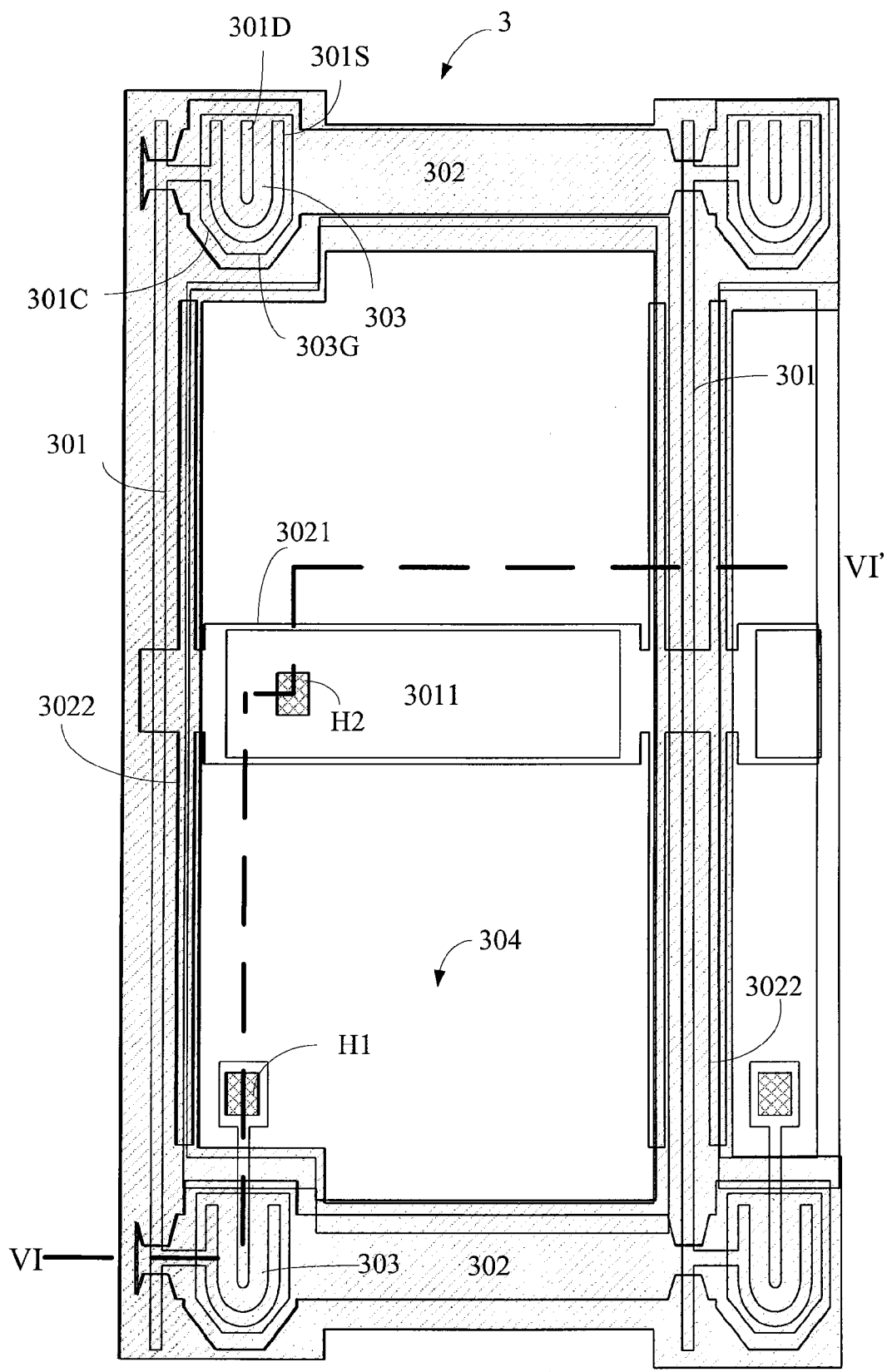
FIG. 6b is a top view illustrating the liquid crystal display panel of the second embodiment of the present invention.
Figure 6C:
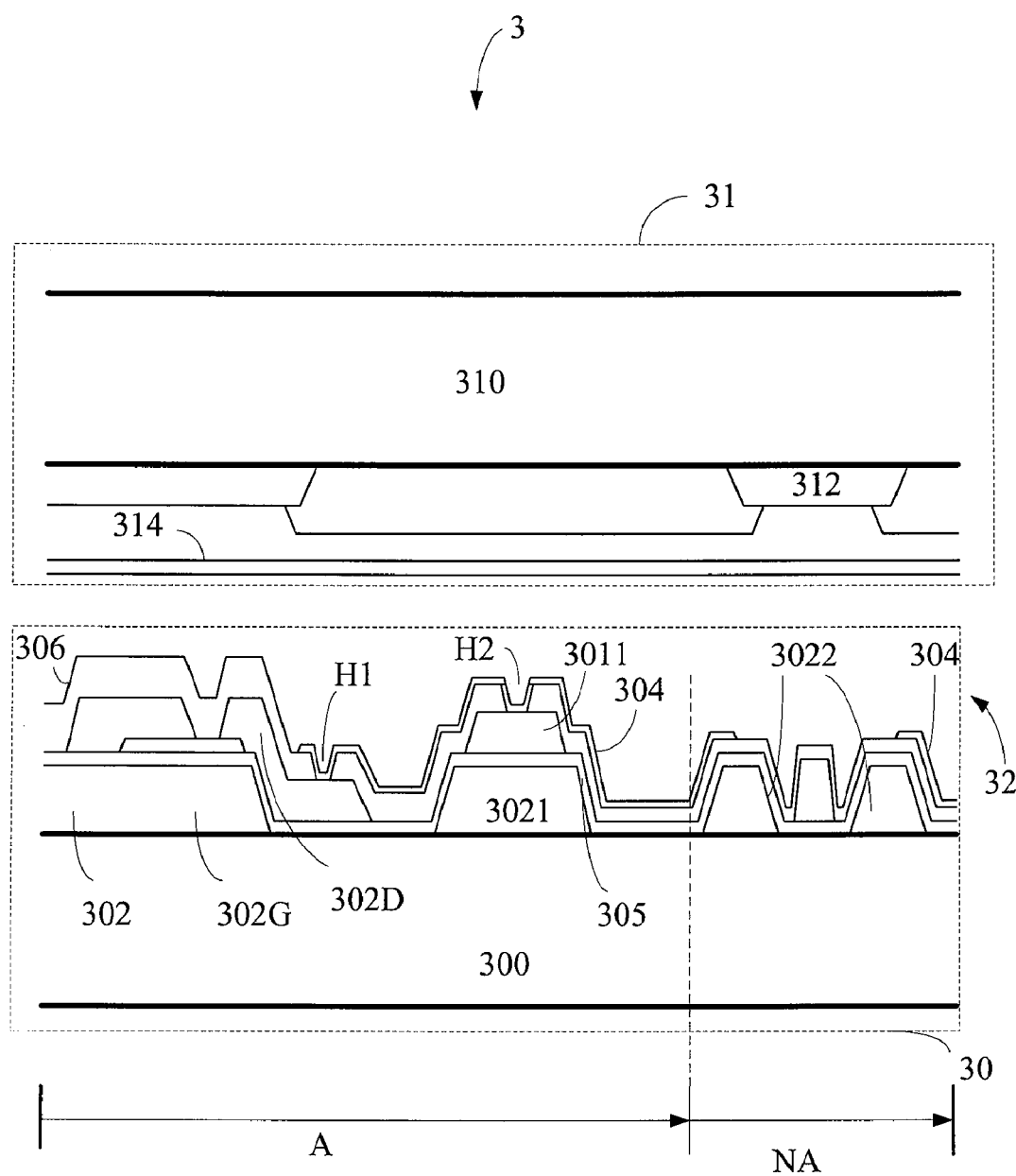
FIG. 6c is a cross-sectional view illustrating the liquid crystal display panel of the second embodiment of the present invention.

FIGS. 6a, 6b, and 6c respectively illustrate a top view of the active array substrate, a top view of the liquid crystal display pane, and a cross-sectional view of the liquid crystal display panel of the second embodiment of the present invention. More specifically, FIG. 6c depicts across-sectional view along line VI-VI' in FIG. 6b. For convenience, FIGS. 6a and 6b only show one pixel structure.

The active array substrate 30 comprises a base 300, scan lines 302, auxiliary electrode 3022, lower capacitor electrode 3021, insulator 305, data lines 301, active device 303, upper capacitor electrode 3011, dielectric layer 306 and pixel electrodes 304.

The scan lines 302, auxiliary electrodes 3022 and lower capacitor electrodes 3021 are formed on the base 300. The insulator 305 completely covers the base 300, scan lines 302, auxiliary electrodes 3022 and lower capacitor electrodes 3021. The data lines 301 are formed on the insulator 305.

The active device 303 is formed on the base 300. Each active device 303 is electrically connected to one of the scan lines 302 and one of the data lines 301. More specifically, the active device 303 comprises gate 303G connected to scan line 302, source 303S connected to data line 301, drain 303D, and channel layer 303C located between the gate 303G and the source 303S/drain 303D. In the present embodiment, the active device 303 may be a bottom gate amorphous thin film transistor, for example, but is not limited thereto.

The upper capacitor electrode 3011 is located on the insulator 305 and corresponds to the lower capacitor electrode 3021. The dielectric layer 306 substantially covers the above elements and has a contact hole H1 to expose the drain 303D, as well as a contact hole H2 to expose the upper capacitor electrode 3011. The pixel electrode 304 is disposed on the dielectric layer 306 and electrically connected to drain 303D via the contact hole H1, and electrically connected to upper capacitor electrode 3011 via the contact hole H2.

Unlike the first embodiment, in the present embodiment, the auxiliary electrodes 3022, scan lines 302 and lower capacitor electrodes 3021 are simultaneously formed by preforming a conductive layer and patterning it as shown in FIG. 6a. Auxiliary electrodes 3022 is electrically connected to the lower capacitor electrodes 3021, so that the auxiliary electrodes 3022 and lower capacitor electrodes 3021 have a same voltage. The auxiliary electrodes 3022 between the two adjacent pixels have an H-shape. However, in other embodiments, the auxiliary electrodes 3022 between the two adjacent pixels may be striped, H-shaped or combination thereof. In other words, any shapes or structure may be used for auxiliary electrodes 3022 if it can achieve the purposes of the present invention, and is not limited thereto. The auxiliary electrodes 3022 and lower capacitor electrodes 3021 are configured to receive a capacitor voltage ranging from −30 volt to 30 volt, and preferably, from −10 volt to 25 volt.

In FIG. 6c, the liquid crystal display panel 3 comprises an active array substrate 30 in FIG. 6a, an electrode substrate 31 and a liquid crystal layer 32 disposed therebetween.

The liquid crystal layer 32 comprises liquid crystal molecules and ions. The liquid crystal molecules have a threshold voltage and a saturation voltage. A specific percentage of ions are located in the non-display region NA.

The electrode substrate 31 has a similar structure as that in the first embodiment. The common electrode 314 is configured to receive a common voltage. The absolute value of the difference between the auxiliary voltage and the common voltage is (1) less than or equal to 1 volt, or (2) from 3 volt to 20 volt.

Because of the arrangements of the auxiliary electrode 3022 of the active array substrate 30, the liquid crystal molecules of the liquid crystal layer 32 in the pixel region A and non-display region NA have different tilt directions. Therefore, the ions 120 would be confined in the non-display region NA. The problems of bad uniformity and image duration will be minimized.

Third Embodiment

Figure 7A:
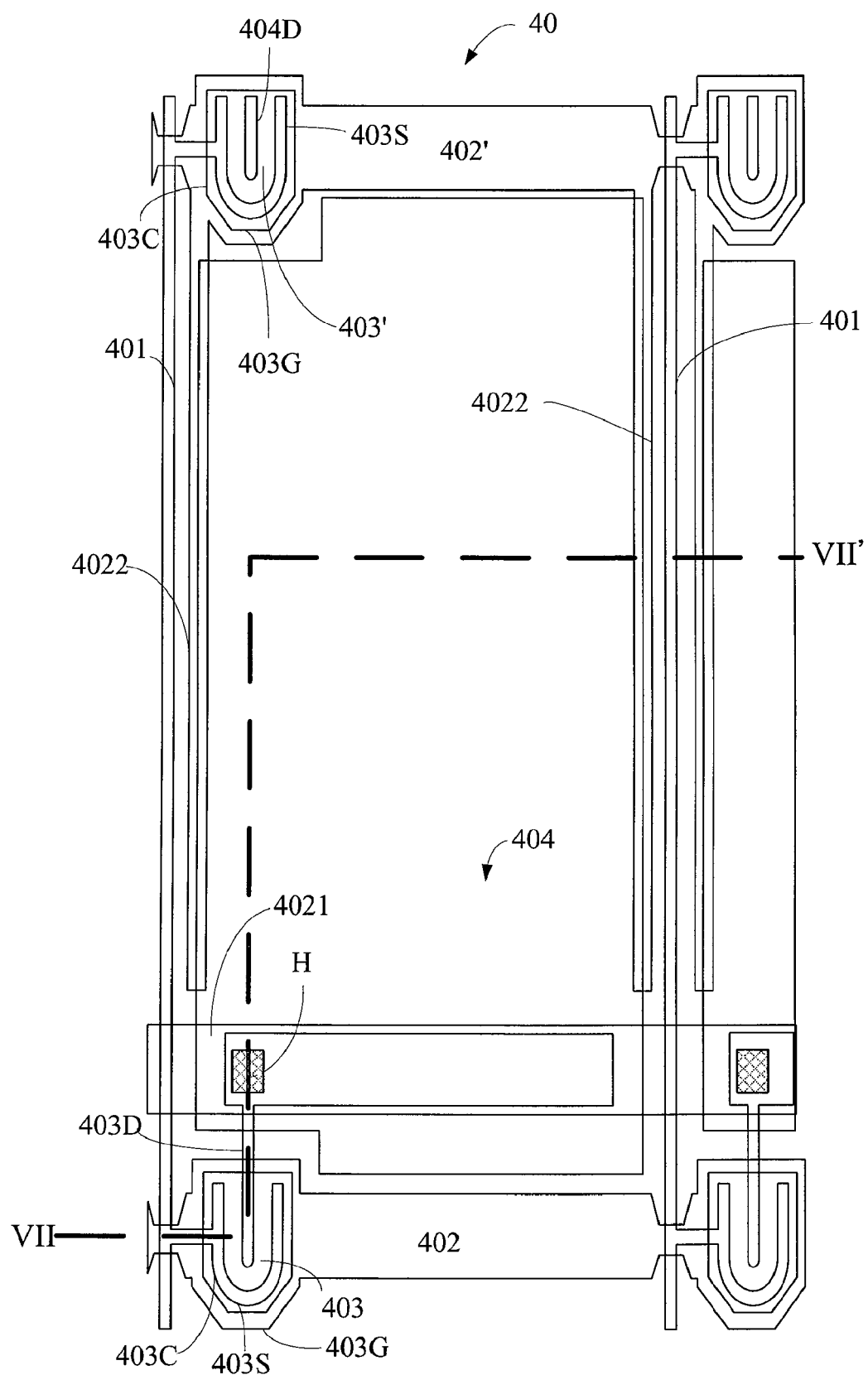
FIG. 7a is a top view illustrating the active array substrate of the third embodiment of the present invention.
Figure 7B:
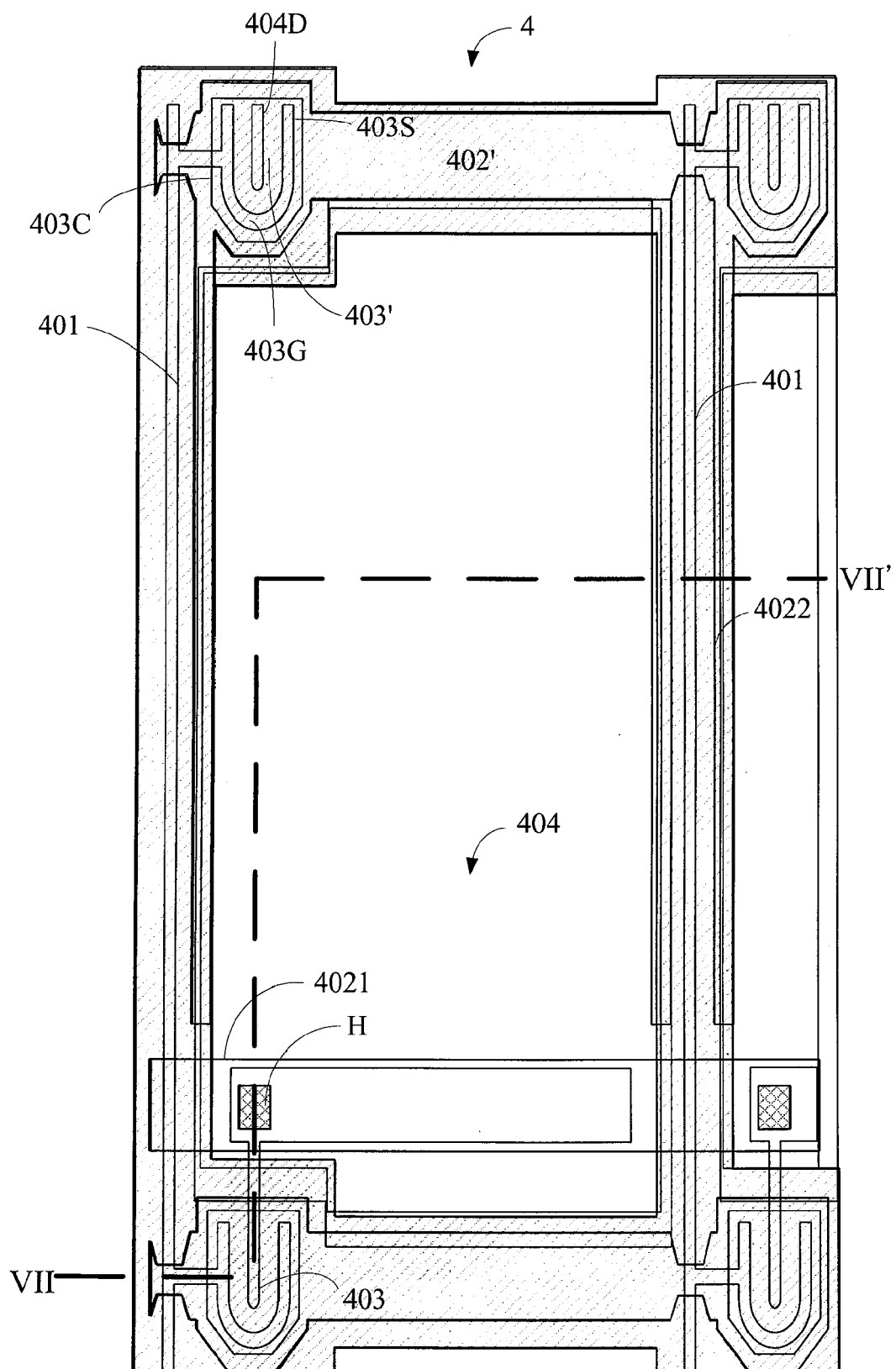
FIG. 7b is a top view illustrating the liquid crystal display panel of the third embodiment of the present invention.
Figure 7C:
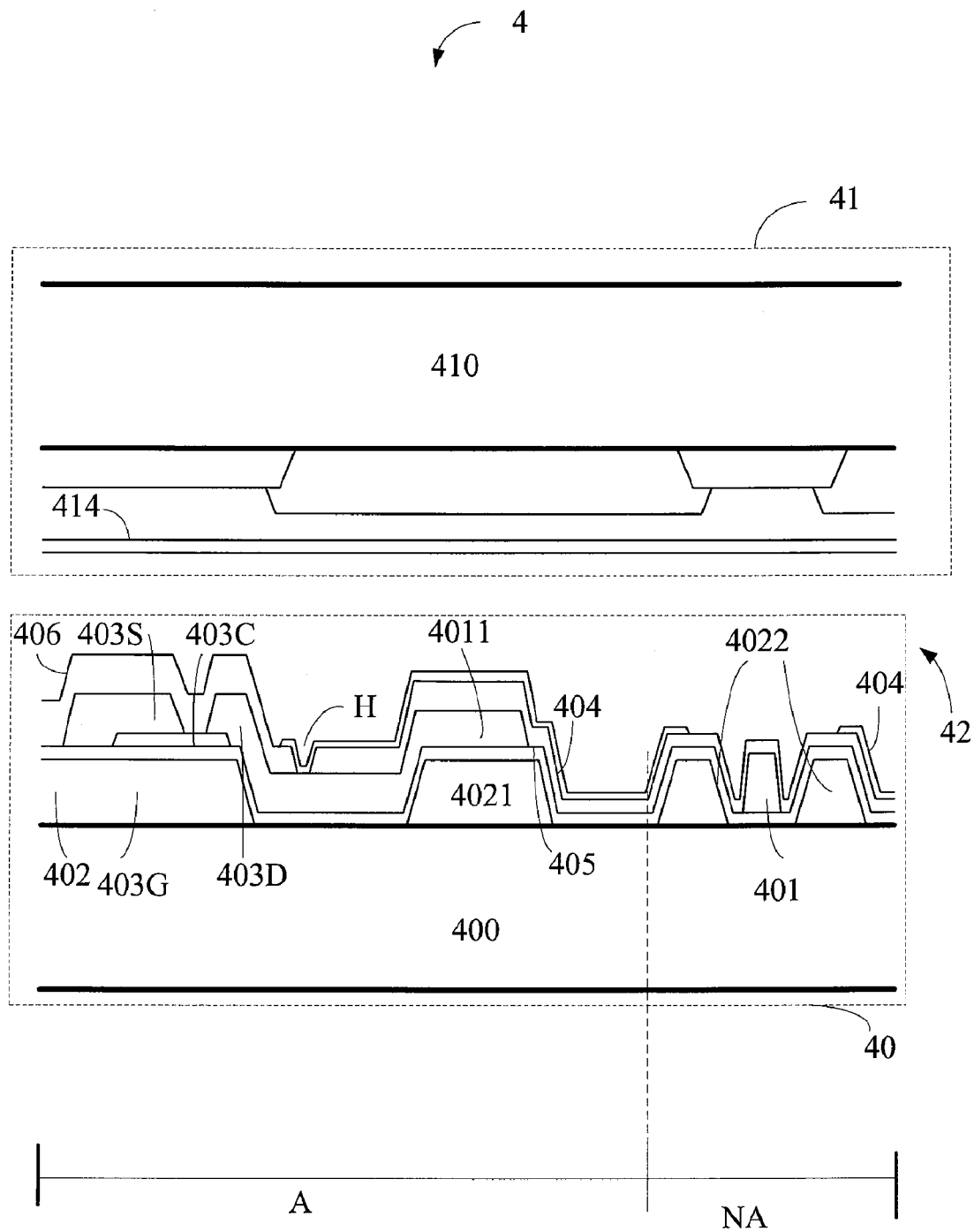
FIG. 7c is a cross-sectional view illustrating the liquid crystal display panel of the third embodiment of the present invention.

FIGS. 7a, 7b and 7c respectively illustrate a top view of the active array substrate, a top view of the liquid crystal display pane, and a cross-sectional view of the liquid crystal display panel of the third embodiment of the present invention. More specifically, FIG. 7c depicts a cross-sectional view along line VII-VII' in FIG. 7b. For convenience, FIGS. 7a and 7b only show one pixel structure.

The active array substrate 40 comprises a base 400, scan lines 402, 402', auxiliary electrode 4022, lower capacitor electrode 4021, insulator 405, data lines 401, active device 403, 403', upper capacitor electrode 4011, dielectric layer 406 and pixel electrodes 404. The scan lines 402, auxiliary electrodes 4022 and lower capacitor electrodes 4021 are formed on the base 400. The insulator 405 completely covers the base 400, scan lines 402, 402', auxiliary electrodes 4022 and lower capacitor electrodes 4021. The data lines 401 are formed on the insulator 405.

The active devices 403, 403' are formed on the base 400. Each active device 403, 403' is electrically connected to the corresponding scan lines 402, 402', and one of the data lines 401. More specifically, the active device 403 comprises gate 403G connected to scan line 402, source 403S connected to data line 401, drain 403D, and channel layer 403C located between the gate 403G and the source 403S/drain 403D. In the present embodiment, the active device 403 may be a bottom gate amorphous thin film transistor, for example, but is not limited thereto.

The upper capacitor electrode 4011 is connected to drain 403D and incorporated with the lower capacitor electrode 4021 to form a capacitor. The dielectric layer 406 substantially covers the elements above and has a contact hole H to expose drain 403D. The pixel electrode 404 is disposed on the dielectric layer 406 and electrically connected to drain 403D via the contact hole H.

Unlike the first embodiment, in the present embodiment, the auxiliary electrode 4022, scan lines 402, 402' and lower capacitor electrodes 4021 are simultaneously formed by preforming a conductive layer and patterning. Specifically, the auxiliary electrode 4022 corresponding to this pixel is electrically connected to scan line 402' but not scan line 402. That is to say, the auxiliary electrode 4022 is an extension of the previous scan line 402'. Therefore, the auxiliary electrode 4022 and scan line 402' have the same voltage. For example, scan line 402' receives a scan voltage ranging from −10 volt to 30 volt, preferably, from −8 volt to 28 volt, so the auxiliary electrode 4022 receives the auxiliary voltage, which is equal to the scan voltage, ranging from −10 volt to 30 volt, and preferably, from −8 volt to 28 volt.

The auxiliary electrodes 4022 between the two adjacent pixels have an H-shape. However, in other embodiments, the auxiliary electrodes 4022 between the two adjacent pixels may be striped, H-shaped or the combination thereof. In other words, any shapes or structure may be used for the auxiliary electrodes 4022 if it can achieve the purposes of the present invention, and is not limited thereto.

In FIG. 7c, the liquid crystal display panel 4 comprises the active array substrate 40 in FIG. 7a, electrode substrate 41 and liquid crystal layer 42 disposed therebetween.

The liquid crystal layer 42 comprises liquid crystal molecules and ions. The liquid crystal molecules have a threshold voltage and a saturation voltage. A specific percentage of ions are located in the non-display region NA.

The electrode substrate 41 has a similar structure as that in the first embodiment. The common electrode 414 is configured to receive a common voltage. The absolute value of the difference between the auxiliary voltage and the common voltage is (1) less than or equal to 1 volt, or (2) from 3 volt to 20 volt.

Because of the arrangements of the auxiliary electrode 4022 of the active array substrate 40, the liquid crystal molecules of the liquid crystal layer 42 in pixel region A and non-display region NA have different tilt directions. Therefore, the ions 120 would be confined in the non-display region NA. The problems of bad uniformity and image sticking will be minimized.

Fourth Embodiment

Figure 8A:
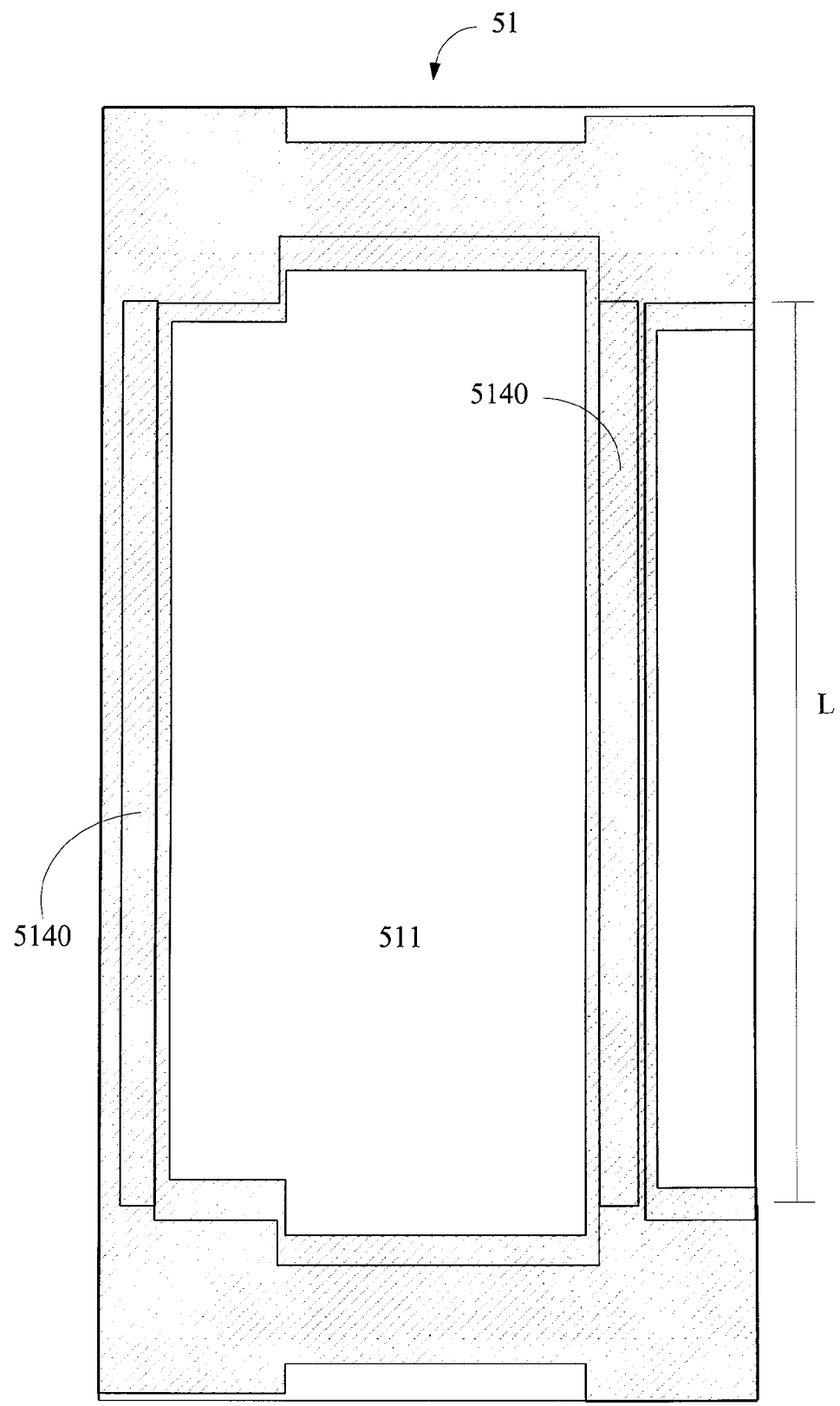
FIG. 8a is a top view illustrating the electrode substrate of the fourth embodiment of the present invention.
Figure 8B:
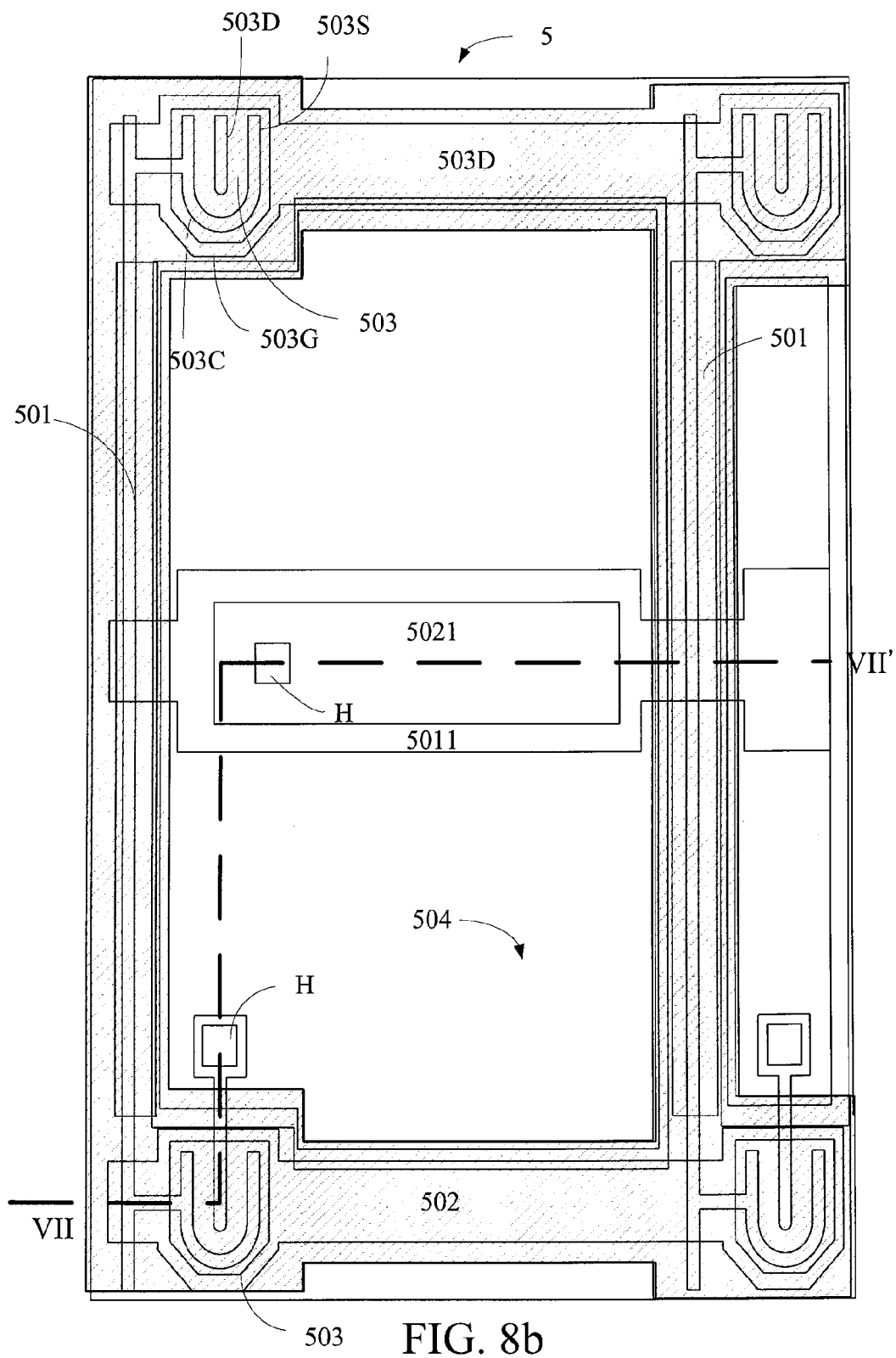
FIG. 8b is a top view illustrating the liquid crystal display panel of the fourth embodiment of the present invention.
Figure 8C:
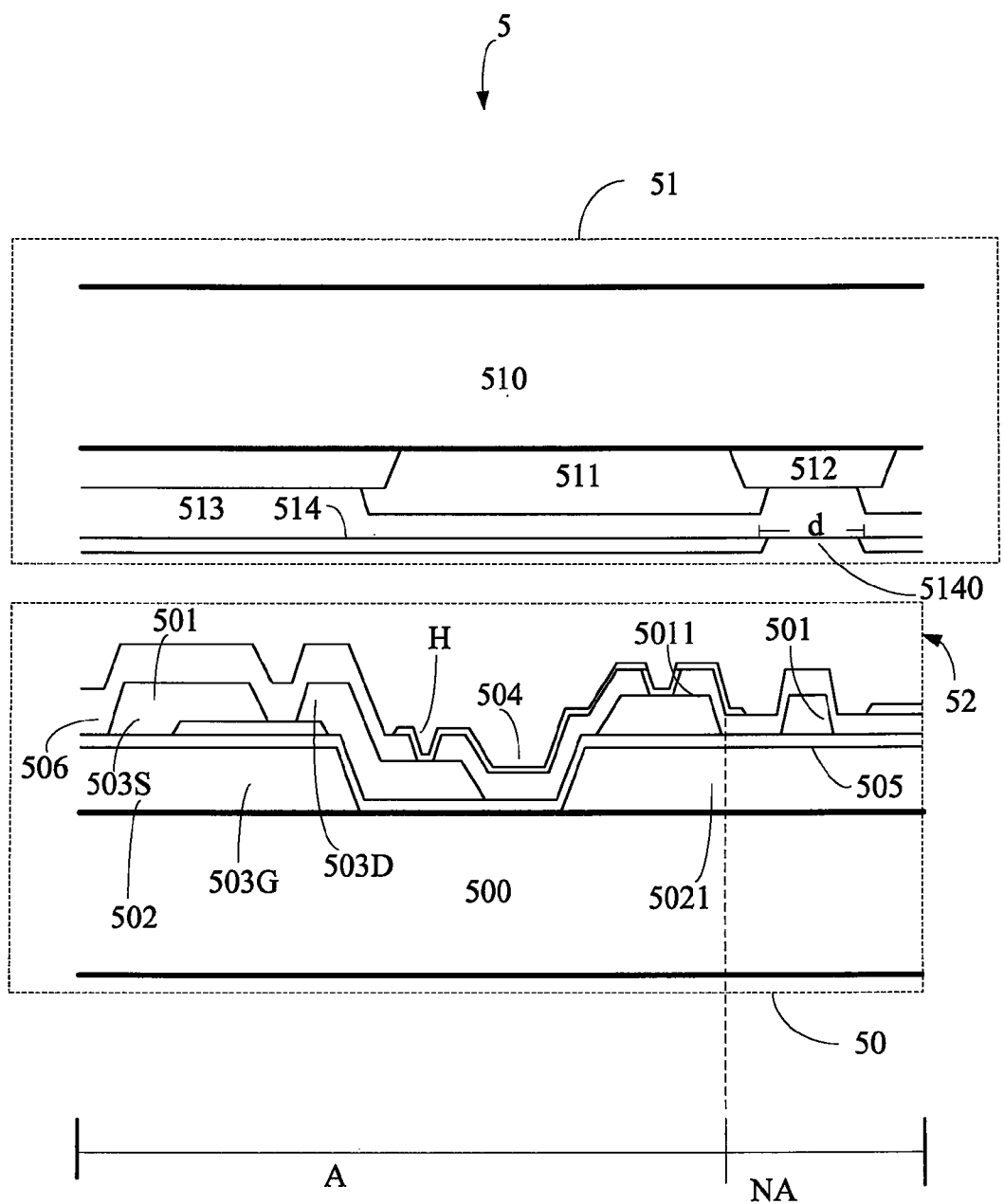
FIG. 8c is a cross-sectional view illustrating the liquid crystal display panel of the fourth embodiment of the present invention.

FIGS. 8a, 8b, and 8c respectively illustrate a top view of the electrode substrate, a top view of the liquid crystal display panel, and a cross-sectional view of the liquid crystal display panel of the fourth embodiment of the present invention. More specifically, FIG. 8c depicts a cross-sectional view along line VIII-VIII' in FIG. 8b. For convenience, FIGS. 8a and 8b only show one pixel structure.

The active array substrate 50 comprises a base 500, scan lines 502, lower capacitor electrode 5021, insulator 505, data lines 501, active device 503, upper capacitor electrode 5011, dielectric layer 506 and pixel electrodes 504. The scan lines 502 and lower capacitor electrode 5021 are formed on the base 500. The insulator 505 completely covers the base 500, scan lines 502 and lower capacitor electrodes 5021. The data lines 501 are formed on the insulator 505.

The active device 503 is formed on the base 500. Each active device 503 is electrically connected to one of the scan lines 502 and one of the data lines 501. More specifically, the active device 503 comprises gate 503G connected to scan line 502, source 503S connected to data line 501, drain 503D, and channel layer 503C located between the gate 503G and the source 503S/drain 503D. In the present embodiment, the active device 503 may be a bottom gate amorphous thin film transistor, for example, but is not limited thereto.

The upper capacitor electrode 5011 is located on the insulator 505 and corresponds to the lower capacitor electrode 5021. The upper capacitor electrode 5011 is electrically connected to drain 503D and incorporated with the lower capacitor electrode 5021 to form a capacitor. The dielectric layer 506 substantially covers the above elements and has a contact hole H to expose the drain 503D. The pixel electrode 504 is disposed on the dielectric layer 506 and electrically connected to the drain 503D via the contact hole H.

The electrode substrate 51 comprises a base 510, shielding structure 512, color filter layer 511, passivation 513 and common electrode 514. The shielding structure 512 is disposed on the base 510. The color filter layer 511 is disposed between the base 510 and the common electrode 514, and divided by the shielding structure 512. The shielding structure 512 can shield light at a boundary of the color filter layer 511 to prevent light leakage while the liquid crystal display panel 5 is displaying images. The base 510 of the electrode substrate 51 has pixel regions, in which each of the pixel regions has a pixel width and a pixel length.

More specifically, the common electrode 514 has slits 5140 corresponding to the locations where the shielding structure 512 or data line 501 are. The slit 5140 has a width d which is 1/20 times to 1/5 times of the pixel width, preferably, 1/10 times to 1/8 times of the pixel width. The width of the slit 5140 may be equal to or greater than that of the data line 501. The length L of the slit 5140 may be equal to, less than or greater than pixel length.

In the non-display region NA, the common electrode 514 has a slit or concave which would affect the tilt directions of liquid crystal molecules of the liquid crystal layer 52 in the pixel region A and non-display region NA. The slit 5140 has a shape of circle, stripe, U-shaped, ∩-shaped, or the combinations thereof. The location of the slit 5140 corresponds to the scan line 502. In other words, the location of the slit 5140 may be totally or partially in response to non-display region NA. The common electrode 514 is configured to receive a common voltage ranging from 0 volt to 12 volt, and preferably, from 3 volt to 9 volt.

Because of the arrangements of the slits 5140, the liquid crystal molecules of the liquid crystal layer 52 in the pixel region A and non-display region NA have different tilt directions. Therefore, the ions 120 would be confined in the non-display region NA. The problems of bad uniformity and image sticking will be minimized.

Fifth Embodiment

Figure 9A:
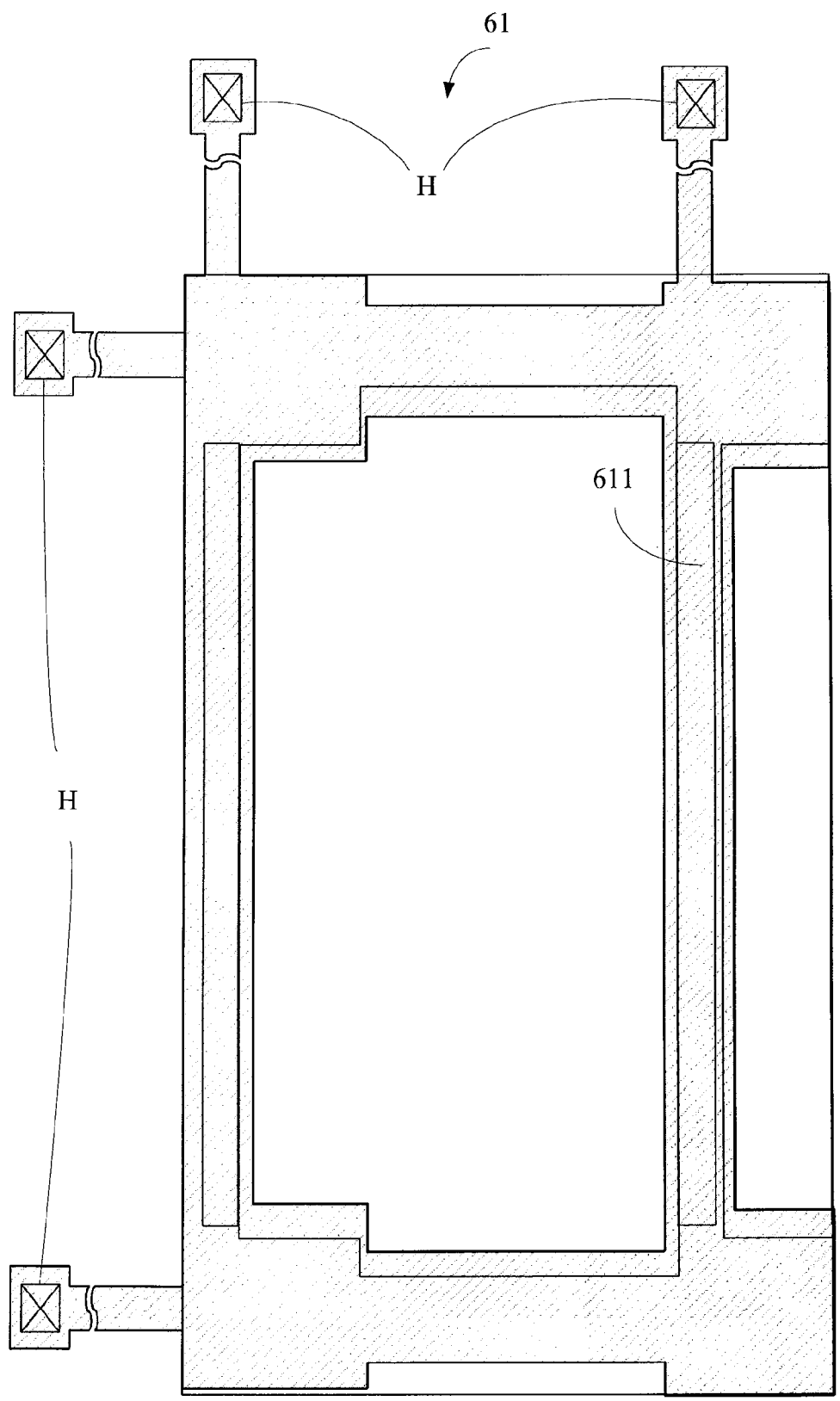
FIG. 9a is a top view illustrating the electrode substrate of the fifth embodiment of the present invention.
Figure 9B:
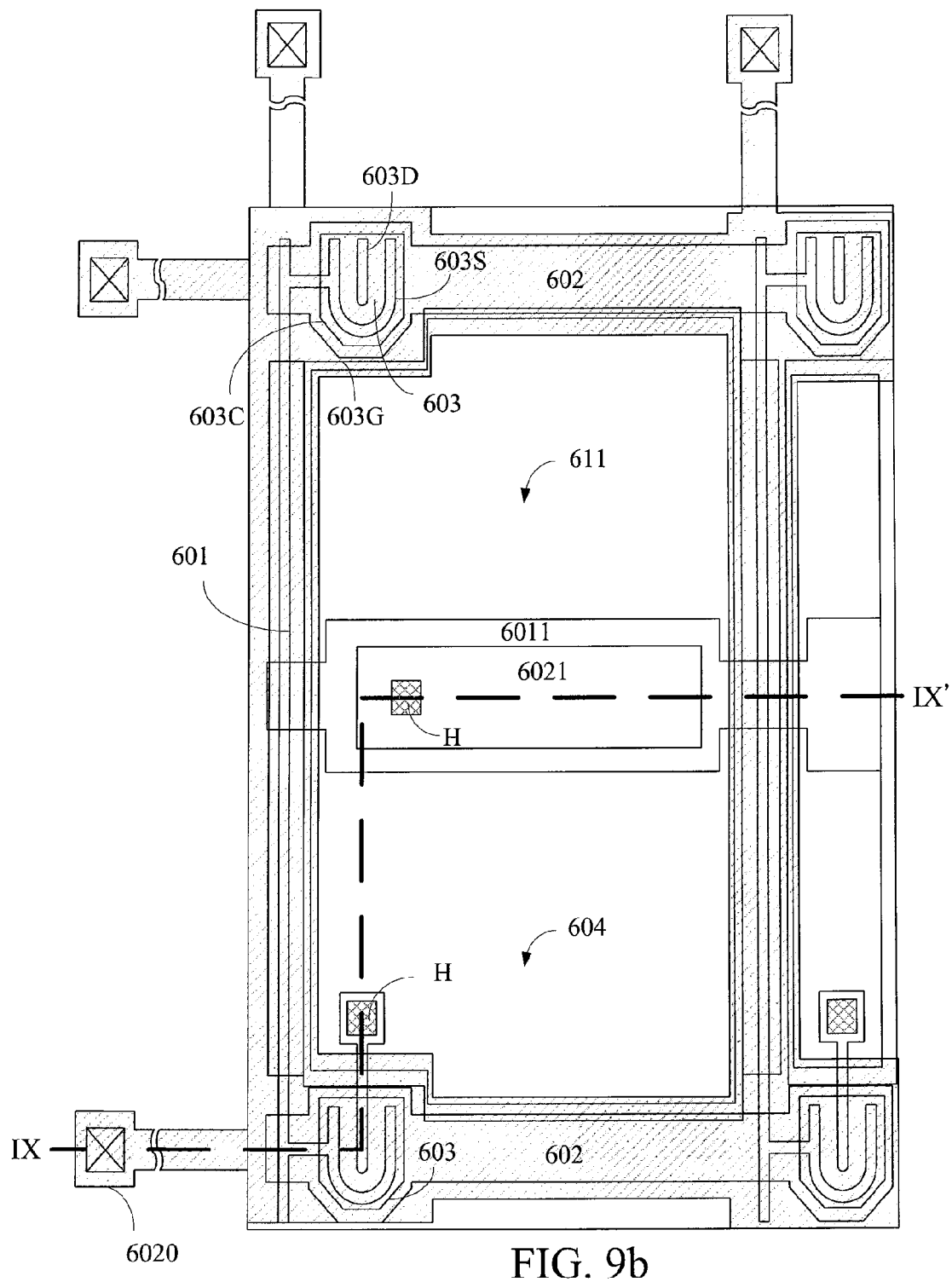
FIG. 9b is a top view illustrating the liquid crystal display panel of the fifth embodiment of the present invention.
Figure 9C:
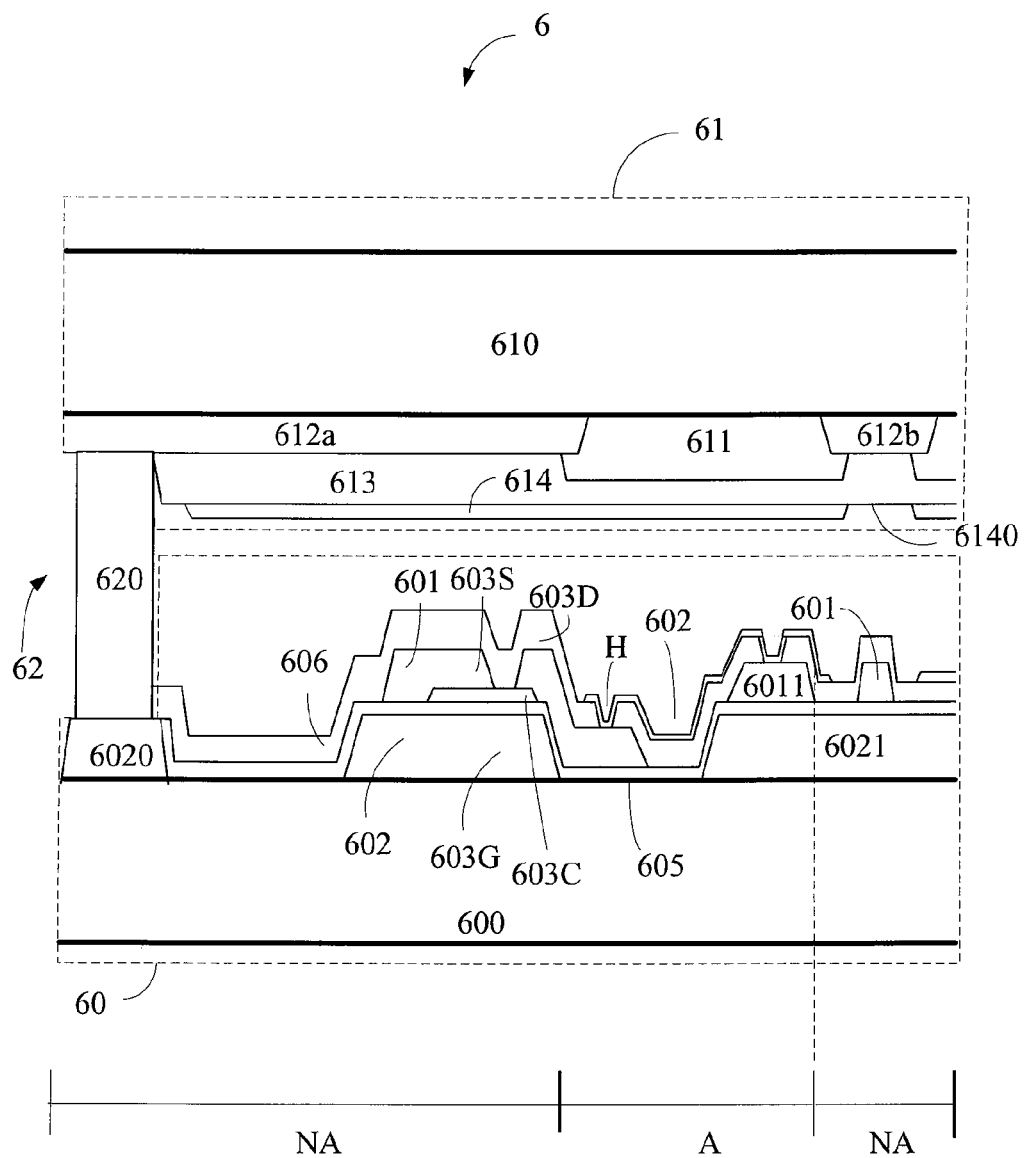
FIG. 9c is a cross-sectional view illustrating the liquid crystal display panel of the fifth embodiment of the present invention.

FIGS. 9a, 9b, and 9c respectively illustrate a top view of the electrode substrate, a top view of the liquid crystal display panel, and a cross-sectional view of the liquid crystal display panel of the fifth embodiment of the present invention. More specifically, FIG. 9c depicts a cross-sectional view along line IX-IX' in FIG. 9b. For convenience, FIGS. 9a and 9b only show the pixel structure.

The active array substrate 60 comprises a base 600, scan lines 602, lower capacitor electrode 6021, insulator 605, data lines 601, active device 603, upper capacitor electrode 6011, dielectric layer 606 and pixel electrodes 604. The scan lines 602 and lower capacitor electrode 6021 are formed on the base 600. The insulator 605 completely covers the base 600, scan lines 602 and lower capacitor electrodes 6021. The data lines 601 are formed on the insulator 605.

The active device 603 is formed on the base 600. Each active device 603 is electrically connected to one of the scan lines 602 and one of the data lines 601. More specifically, the active device 603 comprises a gate 603G connected to scan line 602, a source 603S connected to data line 601, a drain 603D, and a channel layer 603C located between the gate 603G and the source 603S/drain 603D. In the present embodiment, the active device 603 may be a bottom gate amorphous thin film transistor, for example, but is not limited thereto.

The upper capacitor electrode 6011 is located on the insulator 605 and corresponds to the lower capacitor electrode 6021. The upper capacitor electrode 6011 is electrically connected to the drain 603D and incorporated with the lower capacitor electrode 6021 to form a capacitor. The dielectric layer 606 substantially covers the above elements and has a contact hole H to expose the drain 603D. The pixel electrode 604 is disposed on the dielectric layer 606 and electrically connected to the drain 603D via the contact hole H.

The electrode substrate 61 comprises a base 610, shielding structure 612a, 612b, color filter layer 611, passivation 613, and common electrode 614. The shielding structures 612a, 612b are disposed on the base 610. The color filter layer 611 is disposed between the base 610 and the common electrode 614, and divided by the shielding structure 612a, 612b. The shielding structures 612a, 612b can shield light at a boundary of the color filter layer 611 to prevent light leakage while the liquid crystal display panel 6 is displaying images. The base 610 of the electrode substrate 61 has pixel regions. Each of the pixel regions has a pixel width and a pixel length.

Specifically, in FIG. 9c, the common electrode 614 corresponding to the shielding structure 612b has a slit 6140 that exposes the shielding structure 612b. The common electrode 614 is divided into blocks by the shielding structures 612b. The shielding voltage pad 6020 is configured to receive outside voltage. The outside voltage is passed through the connector 620, which is disposed between the active array substrate 60 and electrode substrate 61, to the shielding structures 612a, 612b such that the shielding structures 612a, 612b have a voltage ranging from −30 volt to 30 volt. As shown in FIG. 9c, the shielding voltage pad 6020, connector 620 and shielding structures 612a are electrically connected.

However, other ways of providing voltage to the shielding structures 612a, 612b may include, for example, disposing only a voltage connector pad or a voltage source on the electrode substrate 61 for providing voltage to the shielding structures 612a, 612b, without disposing the connector 620. The shielding structures 612a, 612b may be comprised of metal, other non-transparent material or the combination thereof. The metal may comprise chromium, chromium alloy, other non-transparent conductive metal or combinations thereof.

The length of the shielding structures 612a, 612b can range from 1/20 times to 1 times of the pixel length. The width of the shielding structures 612a, 612b can range from 1/20 times to 1 times of the pixel width. The thickness of the shielding structures 612a, 612b ranges from 0.01 micrometers to 5 micrometers. Furthermore, the absolute value of the difference between the voltage of the common electrode 614 and that of the shielding structures 612a, 612b ranges from 2 volt to 20 volt, for example.

Because of the arrangements of the shielding structures 612a, 612b in the non-display region NA and the voltage applied to the shielding structures 612a, 612b, the liquid crystal layer 62 corresponding to pixel region A and non-display region NA have different voltage differences. Hence, the liquid crystal molecules of the liquid crystal layer in pixel region A and non-display region NA have different tilt directions. Therefore, the ions 120 are confined to the non-display region NA. The problems of bad uniformity and image sticking are minimized.

Sixth Embodiment

Figure 10A:
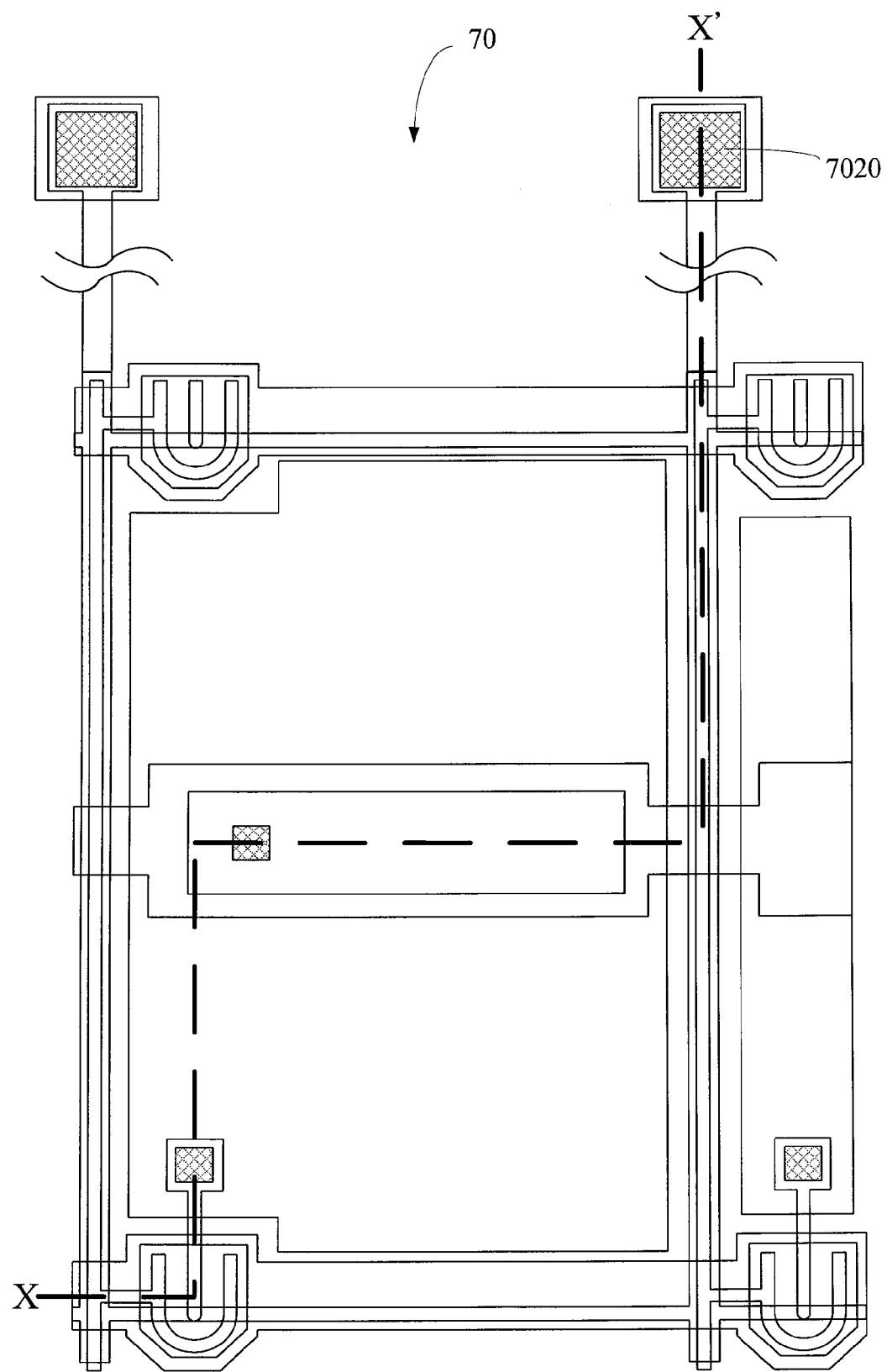
FIG. 10a is a top view illustrating the active array substrate of the sixth embodiment of the present invention.
Figure 10B:
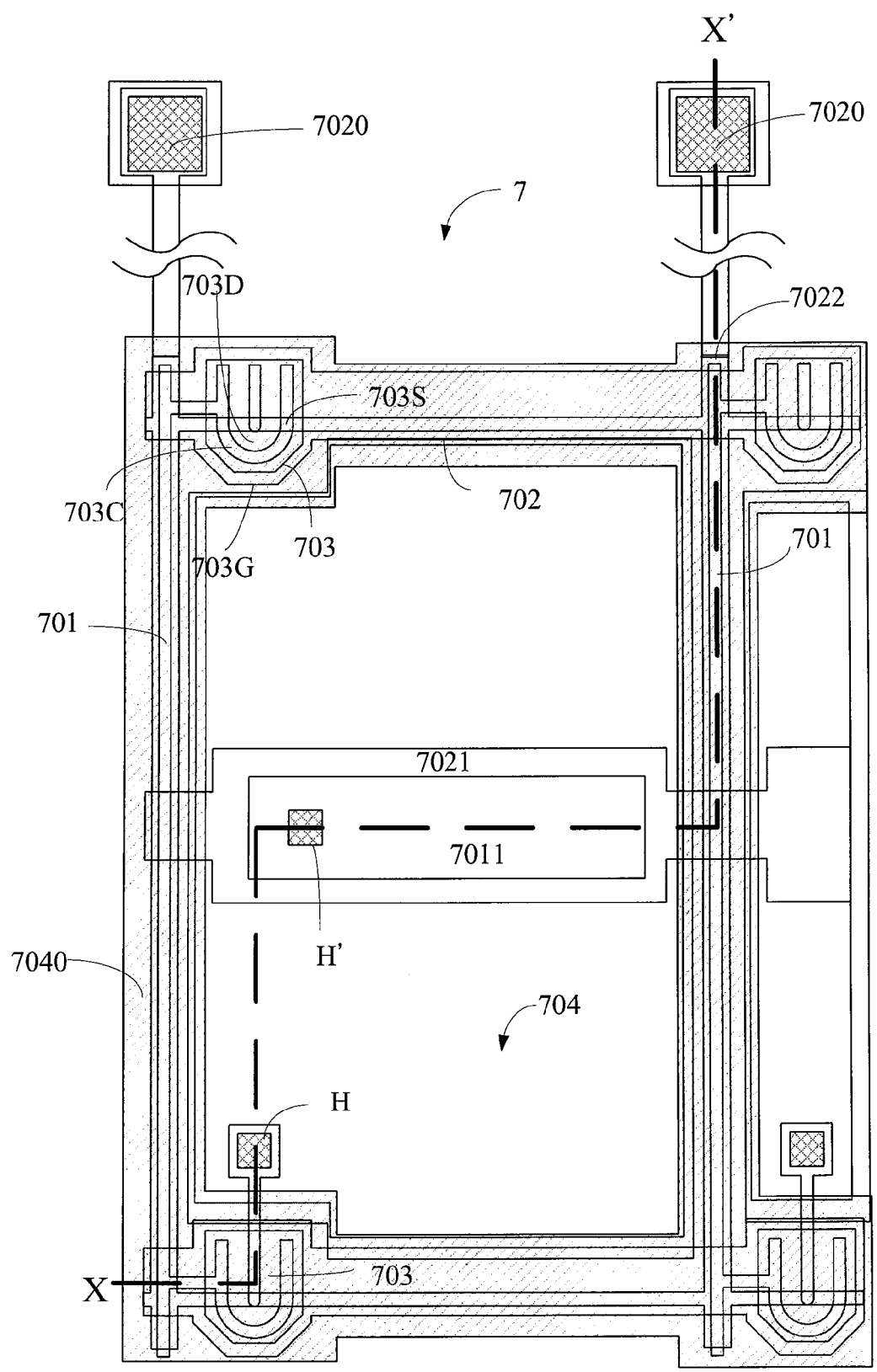
FIG. 10b is a top view illustrating the liquid crystal display panel of the sixth embodiment of the present invention.
Figure 10C:
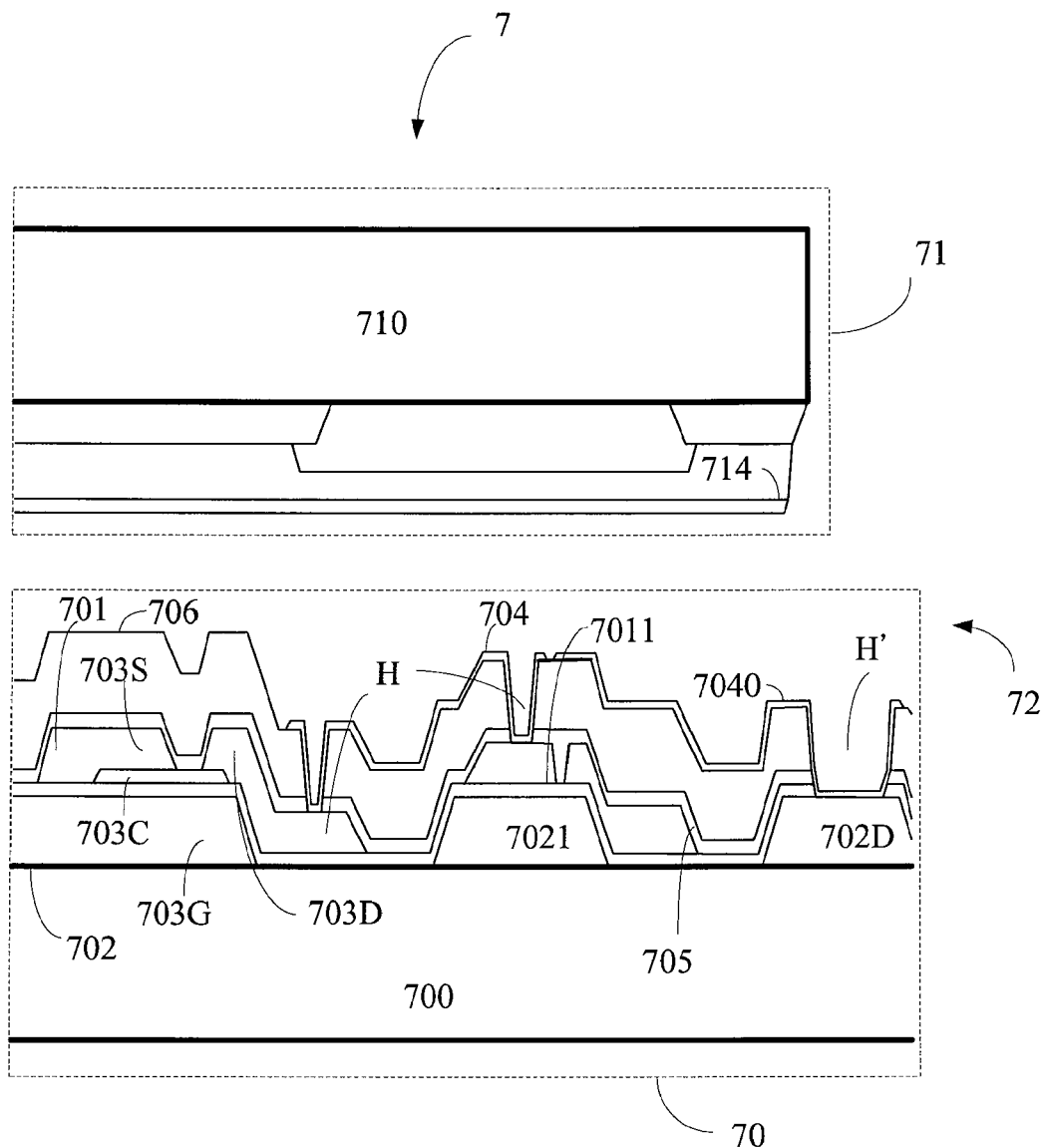
FIG. 10c is a cross-sectional view illustrating the liquid crystal display panel of the sixth embodiment of the present invention.

FIGS. 10a, 10b, and 10c respectively illustrate a top view of the active array substrate, a top view of the liquid crystal display panel, and a cross-sectional view of the liquid crystal display panel of the sixth embodiment of the present invention. More specifically, FIG. 10c depicts a cross-sectional view along line X-X' in FIG. 10b. For convenience, FIGS. 10a and 10b only show the pixel structure.

The active array substrate 70 comprises a base 700, scan lines 702, auxiliary electrode 7040, lower capacitor electrode 7021, insulator 705, data lines 701, active device 703, upper capacitor electrode 7011, dielectric layer 706, pixel electrodes 704 and auxiliary voltage pad 7020. The scan lines 702, auxiliary electrode 7040 and lower capacitor electrode 7021 are formed on the base 700. The auxiliary electrode 7040 and pixel electrode 704 are simultaneously formed by patterning the conductive layer. The insulator 705 completely covers the base 700, scan lines 702 and lower capacitor electrodes 7021. The data lines 701 are formed on the insulator 705.

The active device 703 is formed on the base 700. Each active device 703 is electrically connected to one of the scan lines 702 and one of the data lines 701. More specifically, the active device 703 comprises gate 703G connected to the scan line 702, a source 703S connected to the data line 701, a drain 703D, and a channel layer 703C located between the gate 703G and the source 703S/drain 703D. In the present embodiment, the active device 703 may be a bottom gate amorphous thin film transistor, for example, but is not limited thereto.

The Upper capacitor electrode 7011 is electrically connected to the drain 703D and incorporated with the lower capacitor electrode 7021 to form a capacitor. The dielectric layer 706 substantially covers the above elements and has a contact hole H to expose drain 703D. The pixel electrode 704 is disposed on the dielectric layer 706 and electrically connected to the drain 703D via the contact hole H. The auxiliary voltage pad 7020, scan lines 702, gate 703G and/or lower capacitor electrode 7021 are formed simultaneously by patterning a conductive layer. The auxiliary voltage pad 7020 is configured to receive an auxiliary voltage provided from the outside.

The electrode substrate 71 has a similar structure as the electrode substrate 21 in the first embodiment. The common electrode 714 is configured to receive a common voltage. For example, the absolute value of the difference between the auxiliary voltage and the common voltage is (1) less than or equal to 1 volt, or (2) from 3 volt to 20 volt.

In FIG. 10a, the auxiliary electrode 7040 is circular. However, in other embodiments, the auxiliary electrode 7040 may be a U-shaped, ∩-shaped, or the combination thereof, in response to non-display region NA. More specifically, the auxiliary electrode 7040 is electrically connected to the auxiliary voltage pad 7020 via the contact hole H', so the auxiliary electrode 7040 receives auxiliary voltage. The auxiliary voltage ranges from −30 volt to 30 volt, and preferably, from −10 volt to 25 volt.

Because of the arrangements of the auxiliary electrode 7040 of the active array substrate 70, the liquid crystal layer 72 corresponding to pixel region A and non-display region NA have different voltage differences. Therefore, the liquid crystal molecules of the liquid crystal layer in pixel region A and the non-display region NA have different tilt directions. Therefore, the ions 120 are confined to the non-display region NA. The problems of bad uniformity and image sticking are minimized.

Seventh Embodiment

Figure 11A:
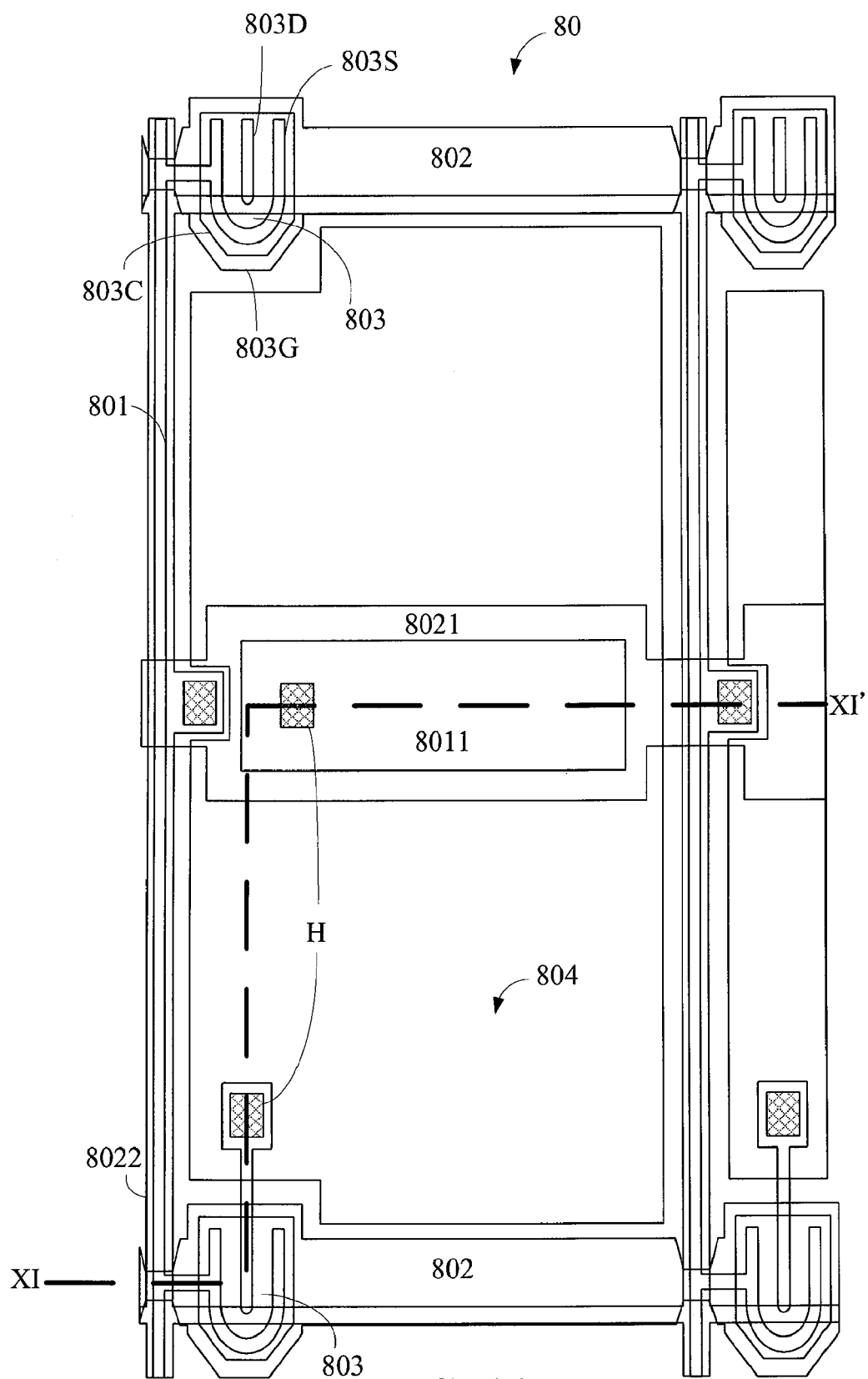
FIG. 11a is a top view illustrating the active array substrate of the seventh embodiment of the present invention.
Figure 11B:
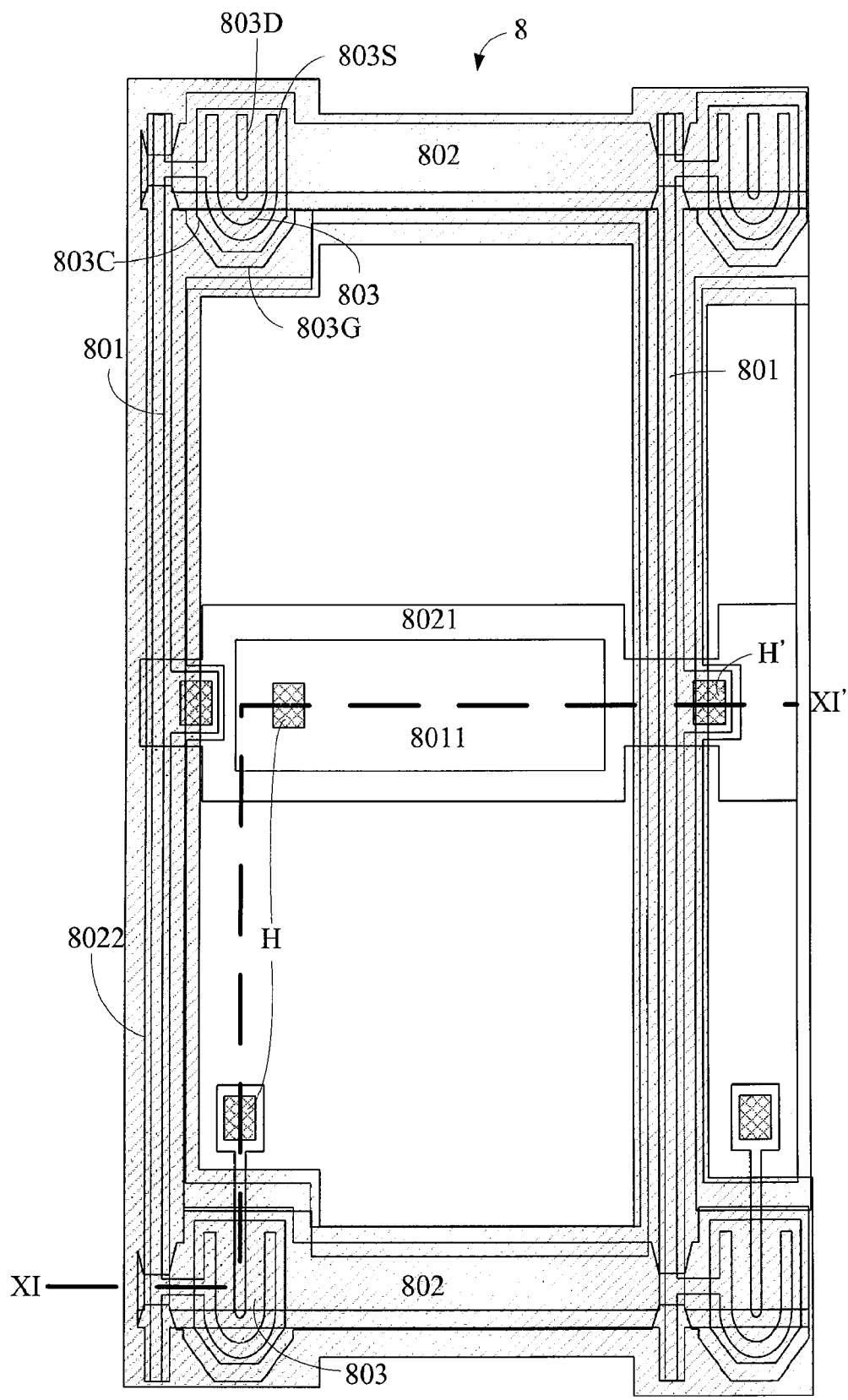
FIG. 11b is a top view illustrating the liquid crystal display panel of the seventh embodiment of the present invention.
Figure 11C:
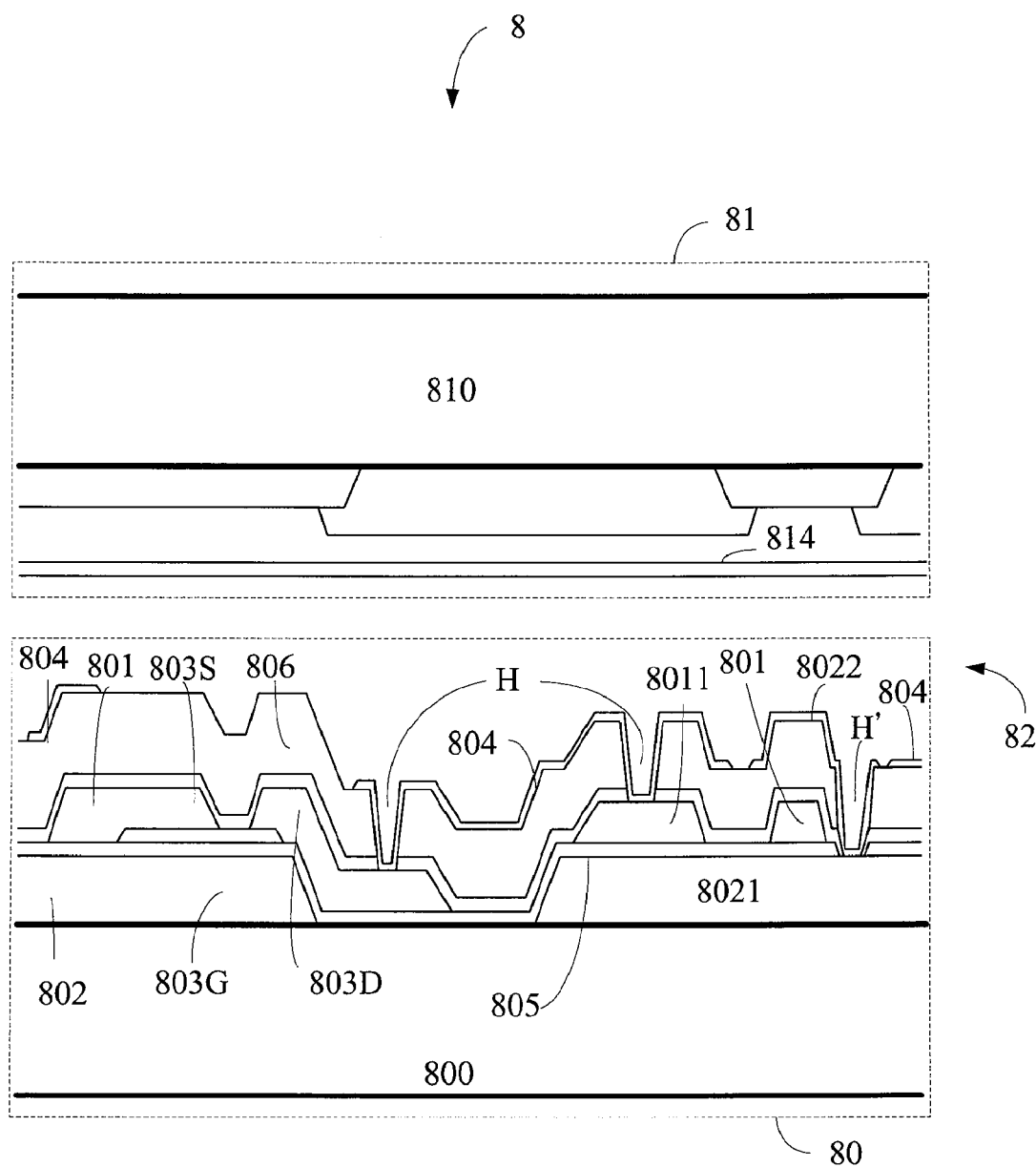
FIG. 11c is a cross-sectional view illustrating the liquid crystal display panel of the seventh embodiment of the present invention.

FIGS. 11a, 11b, and 11c respectively illustrate a top view of the active array substrate, a top view of the liquid crystal display panel, and a cross-sectional view of the liquid crystal display panel of the seventh embodiment of the present invention. More specifically, FIG. 11c depicts a cross-sectional view along line XI-XI' in FIG. 11b. For convenience, FIGS. 11a and 11b only show one pixel structure.

The active array substrate 80 comprises a base 800, scan lines 802, auxiliary electrode 8022, lower capacitor electrode 8021, insulator 805, data lines 801, active device 803, upper capacitor electrode 8011, dielectric layer 806 and pixel electrodes 804. The scan lines 802, auxiliary electrode 8022 and lower capacitor electrode 8021 are formed on the base 800. The auxiliary electrode 8022 and pixel electrode 804 are formed in a same layer and simultaneously formed by patterning the conductive layer. The insulator 805 completely covers the base 800, scan lines 802 and lower capacitor electrodes 8021. The data lines 801 are formed on the insulator 805.

The active device 803 is formed on the base 800. Each active device 803 is electrically connected with one of the scan lines 802 and one of the data lines 801. More specifically, the active device 803 comprises a gate 803G connected to the scan line 802, a source 803S connected to the data line 801, a drain 803D, and a channel layer 803C located between the gate 803G and the source 803S/drain 803D. In the present embodiment, the active device 803 may be a bottom gate amorphous thin film transistor, for example, but is not limited thereto.

The upper capacitor electrode 8011 is electrically connected to a drain 803D and is incorporated with a lower capacitor electrode 8021 to form a capacitor. The dielectric layer 806 substantially covers the above elements and has a contact hole H to expose drain 803D. The pixel electrode 804 is disposed on the dielectric layer 806 and electrically connected to the drain 803D via the contact hole H.

The electrode substrate 81 has a similar structure as the electrode substrate 21 in the first embodiment. The common electrode 814 is configured to receive a common voltage. For example, the absolute value of the difference between the auxiliary voltage and the common voltage is (1) less than or equal to 1 volt, or (2) from 3 volt to 20 volt.

In FIG. 11a, the auxiliary electrode 8022 is circular. However, in other embodiments, the auxiliary electrode 8022 may be U-shaped, ∩-shaped, or the combination thereof, in response to non-display region NA. More specifically, unlike the sixth embodiment, the auxiliary electrode 8022 is electrically connected to the lower capacitor electrode 8021 via the contact hole H', so that the auxiliary electrode 8022 receives the capacitor voltage of the lower capacitor electrode 8021 serving as an auxiliary voltage of the auxiliary electrode 8022. The capacitor voltage ranges from −30 volt to 30 volt, so the auxiliary voltage ranges from −30 volt to 30 volt.

Because of the arrangements of the auxiliary electrode 8022 of the active array substrate 80, the liquid crystal layer 82 corresponding to the pixel region A and non-display region NA have different voltage differences. Therefore, the liquid crystal molecules of the liquid crystal layer in pixel region A and non-display region NA have different tilt directions. Therefore, the ions 120 are confined in the non-display region NA. The problems of bad uniformity and image sticking are minimized.

Eighth Embodiment

Figure 12A:
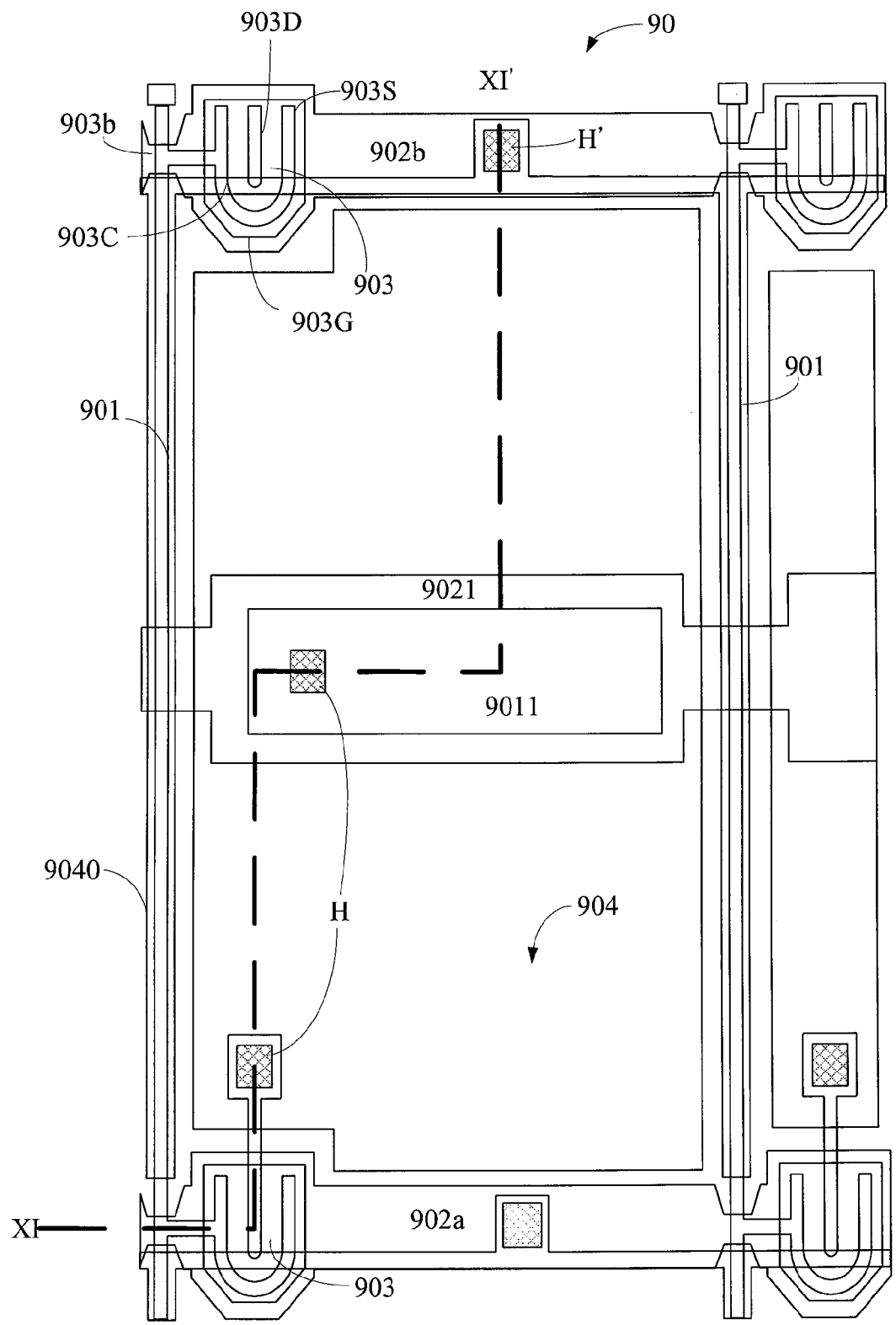
FIG. 12a is a top view illustrating the active array substrate of the eighth embodiment of the present invention.
Figure 12B:
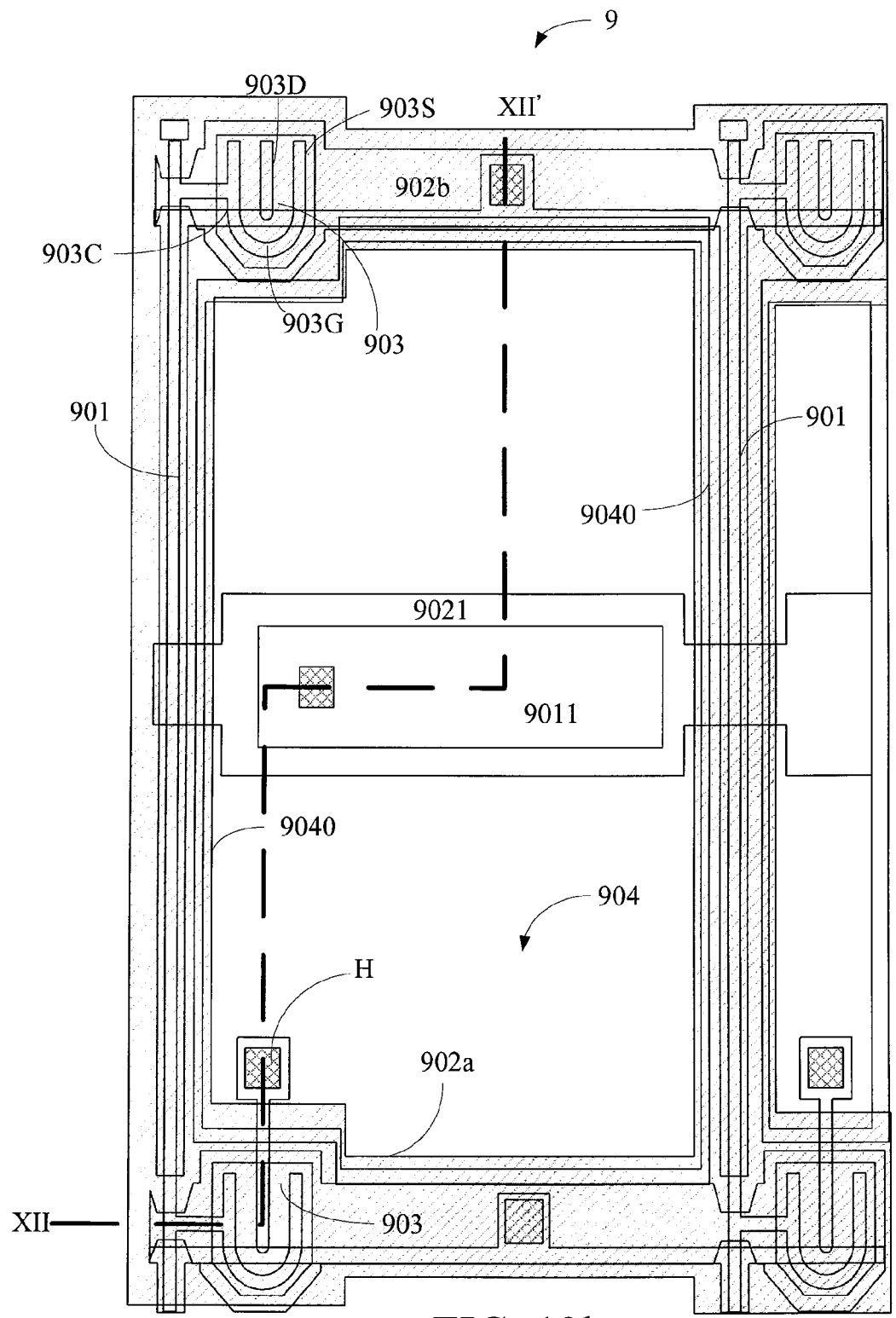
FIG. 12b is a top view illustrating the liquid crystal display panel of the eighth embodiment of the present invention.
Figure 12C:
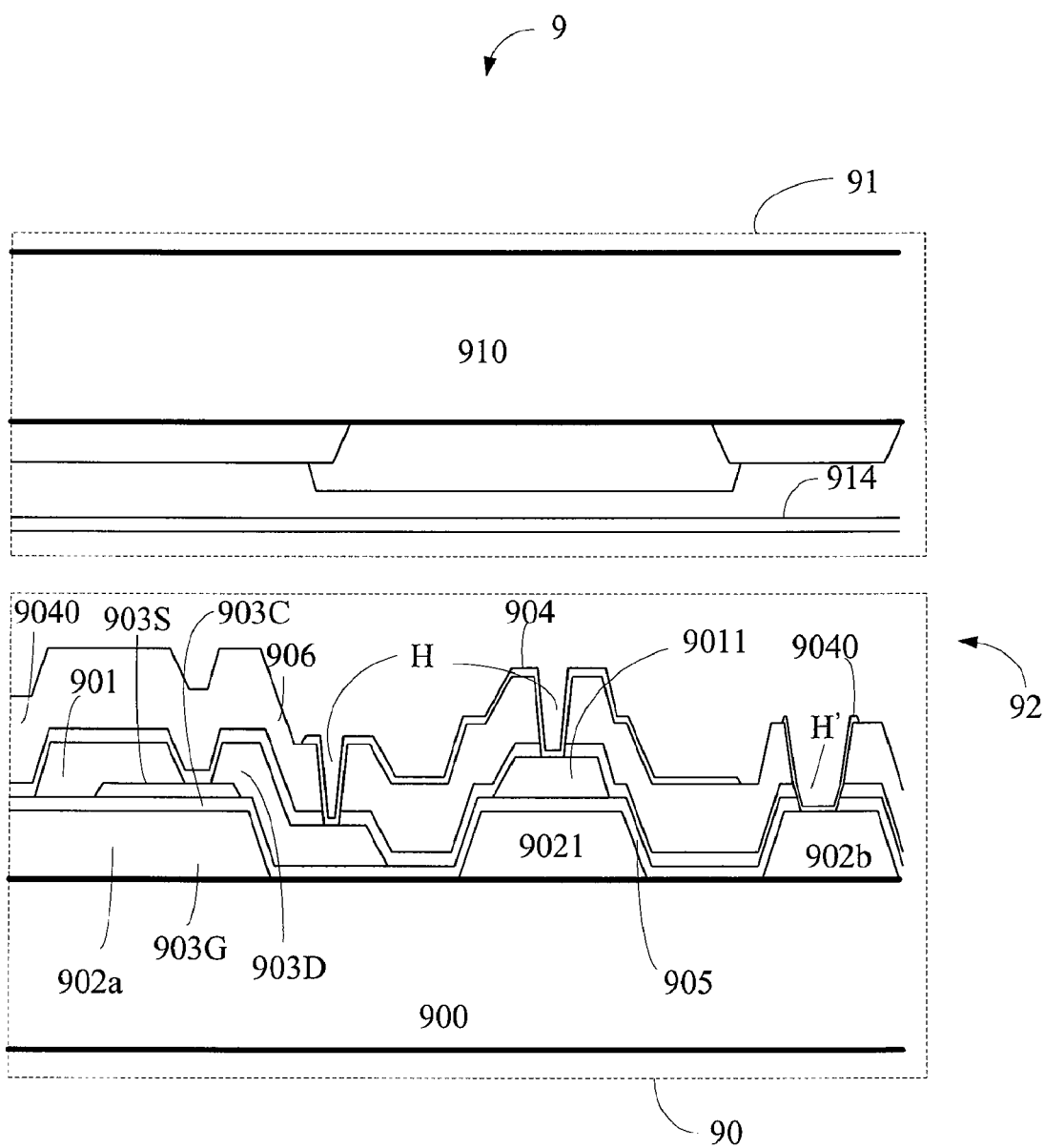
FIG. 12c is a cross-sectional view illustrating the liquid crystal display panel of the eighth embodiment of the present invention.

FIGS. 12a, 12b, and 12c respectively illustrate a top view of the active array substrate, a top view of the liquid crystal display panel, and a cross-sectional view of the liquid crystal display panel of the eighth embodiment of the present invention. More specifically, FIG. 12c depicts a cross sectional view along line XII-XII' in FIG. 12b. For convenience, FIGS. 12a and 12b only show one pixel structure.

The active array substrate 90 comprises a base 900, scan lines 902a, 902b, auxiliary electrode 9040, lower capacitor electrode 9021, insulator 905, data lines 901, active device 903, upper capacitor electrode 9011, dielectric layer 906 and pixel electrodes 904. The scan lines 902a, 902b, auxiliary electrode 9040 and lower capacitor electrode 9021 are formed on the base 900. The scan line 902b is adjacent to scan line 902a. The auxiliary electrode 9040 and pixel electrode 904 are formed in the same layer and simultaneously formed by patterning the conductive layer. The insulator 905 completely covers the base 900, scan lines 902a, 902b and lower capacitor electrodes 9021. The data lines 901 are formed on the insulator 905.

The active device 903 is formed on the base 900. Each active device 903 is electrically connected to one of the scan lines 902a and one of the data lines 901. More specifically, the active device 903 comprises a gate 903G connected to scan line 902a, a source 903S connected with the data line 901, a drain 903D, and a channel layer 903C located between the gate 903G and the source 903S/drain 903D. In the present embodiment, the active device 903 may be a bottom gate amorphous thin film transistor, for example, but is not limited thereto.

The upper capacitor electrode 9011 is electrically connected to the drain 903D and is incorporated with the lower capacitor electrode 9021 to form a capacitor. The dielectric layer 906 substantially covers the above elements and has a contact hole H to expose drain 903D. The pixel electrode 904 is disposed on the dielectric layer 906 and electrically connected to drain 903D via the contact hole H.

The electrode substrate 91 has a similar structure as the electrode substrate 21 in the first embodiment. The common electrode 914 is configured to receive a common voltage. For example, the absolute value of the difference between the auxiliary voltage and the common voltage is (1) less than or equal to 1 volt, or (2) from 3 volt to 20 volt.

In FIG. 12a, the auxiliary electrode 9040 is ∩-shaped. However, in other embodiments, the auxiliary electrode 9040 may be U-shaped or circular, in response to the non-display region NA. More specifically, unlike the seventh embodiment, the auxiliary electrode 9040 is electrically connected to the scan line 902b via contact hole H', so the auxiliary electrode 9040 receives the scan voltage of the scan line 902b serving as an auxiliary voltage of the auxiliary electrode 9040. The scan voltage ranges from −10 volt to 30 volt, so that the auxiliary voltage ranges from −10 volt to 30 volt. The scan line 902b is adjacent/ previous to scan line 902a, and because of the time sequence and difference, the voltages applied to the auxiliary electrode 9040 and scan line 902a are different at a same time. Thereby, because of the arrangements of the auxiliary electrode 9040 in the non-display region NA and the auxiliary electrode 9040 with the auxiliary voltage, the liquid crystal layer 92 corresponding to the pixel region A and non-display region NA have different voltage differences. Therefore, the liquid crystal molecules of the liquid crystal layer 92 in pixel region A and non-display region NA have different tilt directions. Therefore, the ions 120 are confined in the non-display region NA. The problems of bad uniformity and image sticking are then minimized.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display panel, comprising:
an active array substrate, having:
    a base;
    a plurality of scan lines disposed on the base;
    a plurality of data lines being perpendicular to the scan lines;
    a plurality of pixel electrodes; and
    a plurality of active devices, wherein each of the active devices is electrically connected to the corresponding scan line, data line, and pixel electrode to define a pixel region and a non-display region;
an electrode substrate, having:
    a base;
    a common electrode disposed on the base of the electrode substrate, wherein the base of the electrode substrate has a plurality of pixel regions, wherein each pixel region has a pixel width, and wherein the common electrode has a plurality of slits, and a width of each of the slits is equal to or greater than a width of the each of the data lines, wherein no electrodes are formed in any of the plurality of slits; and at least one shielding structure disposed on the base of the electrode substrate to divide the common electrode into a plurality of blocks; and a liquid crystal layer disposed between the active array substrate and the electrode substrate, having:
a plurality of liquid crystal molecules each having a threshold voltage and a saturation voltage; and
a plurality of ions located in the non-display region.

2. The liquid crystal display panel of claim 1, wherein the active array substrate further comprises at least one auxiliary electrode disposed on the base of the active array substrate and located in the non-display region, the at least one auxiliary electrode is configured to receive an auxiliary voltage, the common electrode is configured to receive a common voltage, and an absolute value of a difference between the auxiliary voltage and the common voltage is less than the threshold voltage of the liquid crystal molecules.

3. The liquid crystal display panel of claim 2, wherein the absolute value of the difference between the auxiliary voltage and the common voltage is greater than the saturation voltage of the liquid crystal molecules.

4. The liquid crystal display panel of claim 1, wherein the liquid crystal molecules are one of vertical alignment (VA) liquid crystal, twisted nematic (TN) liquid crystal, and electrical control birefringence (ECB) liquid crystal.

5. The liquid crystal display panel of claim 1, wherein each of the ions comprises cation ions, anion ions, or charged ions group.

6. The liquid crystal display panel of claim 1, wherein the active array substrate further comprises at least one auxiliary electrode disposed on the base and located in the non-display region, the at least one auxiliary electrode is configured to receive an auxiliary voltage ranging from −30 volt to 30 volt.

7. The liquid crystal display panel of claim 6, the active array substrate further comprising a capacitor electrode disposed on the base, wherein the capacitor electrode is configured to receive a capacitor voltage ranging from −30 volt to 30 volt, the at least one auxiliary electrode and one of the pixel electrodes are mutually isolated and located in a same layer; and a shape of the at least one auxiliary electrode is one of circle, stripe, U-shaped and ∩-shaped.

8. The liquid crystal display panel of claim 6, wherein the active array substrate further comprises a capacitor electrode disposed on the base, and the capacitor electrode is electrically connected to the at least one auxiliary electrode.

9. The liquid crystal display panel of claim 6, wherein the active array substrate further comprises a capacitor electrode disposed on the base, and the capacitor electrode and the at least one auxiliary electrode are mutually isolated and located in a same layer.

10. The liquid crystal display panel of claim 6, wherein the at least one auxiliary electrode is electrically connected to one of the scan lines.

11. The liquid crystal display panel of claim 6, wherein the at least one auxiliary electrode and one of the scan lines are mutually isolated and located in a same layer.

12. The liquid crystal display panel of claim 1, wherein each of the silts has a width being $1/20$ times to $1/5$ times to the pixel width.

13. The liquid crystal display panel of claim 12, wherein a shape of each slit is one of circle, stripe, U-shaped, and ∩-shaped.

14. The liquid crystal display panel of claim 1, wherein the shielding structure is applied with a voltage ranging from −30 volt to 30 volt.

15. The liquid crystal display panel of claim 14, wherein each pixel region has a pixel length and a pixel width, the shielding structure has a length being from $1/20$ times to 1 times to the pixel length, the shielding structure has a width being $1/20$ times to 1 times to the pixel width, and the shielding structure has a thickness ranging from 0.01 micrometers to 5 micrometers.

16. The liquid crystal display panel of claim 14, wherein the active array substrate further comprises a shielding voltage pad, the at least one shielding structure is electrically connected to the shielding voltage pad.

17. The liquid crystal display panel of claim 16, further comprising:
a connector, disposed between the active array substrate and the electrode substrate, being configured to connect the shielding structure and the shielding voltage pad.

18. A liquid crystal display panel, comprising:
an active array substrate, having:
a base;
a plurality of scan lines disposed on the base;
a plurality of data lines being perpendicular to the scan lines;
a plurality of pixel electrodes; and
a plurality of active devices, wherein each of the active devices is electrically connected to the corresponding scan line, data line, and pixel electrode to define a pixel region and a non-display region;
an electrode substrate, having:
a base;
a common electrode disposed on the base of the electrode substrate, wherein the base of the electrode substrate has a plurality of pixel regions, wherein the common electrode has a plurality of slits, and a width of each of the slits is equal to or greater than a width of the each of the data lines, wherein no electrodes are formed in any of the plurality of slits; and
at least one shielding structure disposed on the base of the electrode substrate to divide the common electrode into a plurality of blocks, wherein the plurality of slits corresponds to locations of the at least one shielding structure or the plurality of data lines; and
a liquid crystal layer disposed between the active array substrate and the electrode substrate, having:
a plurality of liquid crystal molecules each having a threshold voltage and a saturation voltage; and
a plurality of ions located in the non-display region.

19. A liquid crystal display panel, comprising:
an active array substrate, having:
a base;
a plurality of scan lines disposed on the base;
a plurality of data lines being perpendicular to the scan lines;
a plurality of pixel electrodes; and
a plurality of active devices, wherein each of the active devices is electrically connected to the corresponding scan line, data line, and pixel electrode to define a pixel region and a non-display region;
an electrode substrate, having:
a base;
a common electrode disposed on the base of the electrode substrate, wherein the common electrode has a plurality of slits, and a width of each of the slits is equal to or greater than a width of the each of the data lines; and
at least one shielding structure disposed on the base to divide the common electrode into a plurality of blocks; and a liquid crystal layer disposed between the active array substrate and the electrode substrate, wherein the shielding structure is applied with a voltage so that the liquid crystal layer corresponding to the pixel region and the non-display region has different voltage differences, and wherein the liquid crystal layer includes:
a plurality of liquid crystal molecules each having a threshold voltage and a saturation voltage; and
a plurality of ions located in the non-display region.

20. The liquid crystal display panel of claim 19, wherein the voltage applied to the shielding structure ranges from −30 volt to 30 volt.

21. The liquid crystal display panel of claim 20, wherein the base of the electrode substrate has a plurality of pixel regions, each pixel region has a pixel length and a pixel width, the shielding structure has a length being from 1/20 times to 1 times to the pixel length, the shielding structure has a width being 1/20 times to 1 times to the pixel width, and the shielding structure has a thickness ranging from 0.01 micrometers to 5 micrometers.

22. The liquid crystal display panel of claim 20, wherein the active array substrate further comprises a shielding voltage pad, the at least one shielding structure is electrically connected to the shielding voltage pad.

23. The liquid crystal display panel of claim 22, further comprising:
a connector, disposed between the active array substrate and the electrode substrate, being configured to connect the shielding structure and the shielding voltage pad.

24. The liquid crystal display panel of claim 19, wherein the liquid crystal molecules are one of vertical alignment (VA) liquid crystal, twisted nematic (TN) liquid crystal, and electrical control birefringence (ECB) liquid crystal.

25. The liquid crystal display panel of claim 19, wherein each of the ions comprises cation ions, anion ions, or charged ions group.

* * * * *